United States Patent
Mikhaylik et al.

(10) Patent No.: US 11,316,204 B2
(45) Date of Patent: Apr. 26, 2022

(54) SEPARATION OF ELECTROLYTES

(71) Applicant: Sion Power Corporation, Tucson, AZ (US)

(72) Inventors: Yuriy V. Mikhaylik, Tucson, AZ (US); Chariclea Scordilis-Kelley, Tucson, AZ (US); Igor P. Kovalev, Vail, AZ (US); Cathie Burgess, Tucson, AZ (US)

(73) Assignee: Sion Power Corporation, Tucson, AZ (US)

( * ) Notice: Subject to any disclaimer, the term of this patent is extended or adjusted under 35 U.S.C. 154(b) by 0 days.

(21) Appl. No.: 16/852,092

(22) Filed: Apr. 17, 2020

(65) Prior Publication Data

US 2020/0350631 A1 Nov. 5, 2020

Related U.S. Application Data

(63) Continuation of application No. 14/078,648, filed on Nov. 13, 2013, now Pat. No. 10,629,954, which is a
(Continued)

(51) Int. Cl.
*H01M 10/0569* (2010.01)
*H01M 4/1395* (2010.01)
(Continued)

(52) U.S. Cl.
CPC ....... *H01M 10/0569* (2013.01); *H01M 4/134* (2013.01); *H01M 4/136* (2013.01);
(Continued)

(58) Field of Classification Search
CPC ......... H01M 10/0525; H01M 10/0565; H01M 10/0566; H01M 10/0569;
(Continued)

(56) References Cited

U.S. PATENT DOCUMENTS 4,252,876 A 2/1981 Koch
4,664,991 A 3/1987 Perichaud et al.
(Continued)

FOREIGN PATENT DOCUMENTS

CN 1415124 A 4/2003
EP 1 178 555 A2 2/2002
(Continued)

OTHER PUBLICATIONS

International Search Report dated Mar. 6, 2008 for PCT/US2007/024805.
(Continued)

*Primary Examiner* — Victoria H Lynch
(74) *Attorney, Agent, or Firm* — Wolf, Greenfield & Sacks, P.C.

(57) ABSTRACT

Methods and articles relating to separation of electrolyte compositions within lithium batteries are provided. The lithium batteries described herein may include an anode having lithium as the active anode species and a cathode having sulfur as the active cathode species. Suitable electrolytes for the lithium batteries can comprise a heterogeneous electrolyte including a first electrolyte solvent (e.g., dioxolane (DOL)) that partitions towards the anode and is favorable towards the anode (referred to herein as an "anode-side electrolyte solvent") and a second electrolyte solvent (e.g., 1,2-dimethoxyethane (DME)) that partitions towards the cathode and is favorable towards the cathode (and referred to herein as an "cathode-side electrolyte solvent"). By separating the electrolyte solvents during operation of the battery such that the anode-side electrolyte solvent is present disproportionately at the anode and the cathode-side electrolyte solvent is present disproportionately at the cathode, the battery can benefit from desirable characteristics of both electrolyte solvents (e.g., relatively
(Continued)

low lithium reactivity of the anode-side electrolyte solvent and relatively high polysulfide solubility of the cathode-side electrolyte solvent).

24 Claims, 9 Drawing Sheets

Related U.S. Application Data continuation of application No. 12/312,764, filed as application No. PCT/US2007/024805 on Dec. 4, 2007, now Pat. No. 8,617,748.

(60) Provisional application No. 60/872,939, filed on Dec. 4, 2006.

(51) Int. Cl.
    *H01M 4/134*     (2010.01)
    *H01M 10/0566*     (2010.01)
    *H01M 4/136*     (2010.01)
    *H01M 10/0565*     (2010.01)
    *H01M 50/411*     (2021.01)
    *H01M 10/0525*     (2010.01)
    *H02J 7/00*     (2006.01)

(52) U.S. Cl.
    CPC ..... *H01M 4/1395* (2013.01); *H01M 10/0525* (2013.01); *H01M 10/0565* (2013.01); *H01M 10/0566* (2013.01); *H01M 50/411* (2021.01); *H02J 7/0068* (2013.01); *H01M 2300/0085* (2013.01); *H01M 2300/0094* (2013.01); *Y10T 29/49115* (2015.01)

(58) Field of Classification Search
    CPC . H01M 2300/0085; H01M 2300/0094; H01M 4/134; H01M 4/136; H01M 4/1395; H01M 50/411; H02J 7/0068; Y02E 60/10; Y10T 29/49115

See application file for complete search history.

(56) References Cited

U.S. PATENT DOCUMENTS

| | | |
|---|---|---|
| 4,739,018 A | 4/1988 | Armand et al. |
| 4,833,048 A | 5/1989 | Dejonghe et al. |
| 4,917,974 A | 4/1990 | Dejonghe et al. |
| 4,954,371 A | 9/1990 | Yializis |
| 5,162,175 A | 11/1992 | Visco et al. |
| 5,194,341 A | 3/1993 | Bagley et al. |
| 5,314,765 A | 5/1994 | Bates et al. |
| 5,324,599 A | 6/1994 | Oyama et al. |
| 5,366,829 A | 11/1994 | Saidi |
| 5,387,479 A | 2/1995 | Koksbang |
| 5,415,954 A | 5/1995 | Gauthier |
| 5,434,021 A | 7/1995 | Fauteux et al. |
| 5,441,831 A | 8/1995 | Okamoto et al. |
| 5,460,905 A | 10/1995 | Skotheim |
| 5,462,566 A | 10/1995 | Skotheim |
| 5,487,959 A | 1/1996 | Koksbang et al. |
| 5,516,598 A | 5/1996 | Visco et al. |
| 5,529,860 A | 6/1996 | Skotheim et al. |
| 5,538,812 A | 6/1996 | Lee et al. |
| 5,569,520 A | 10/1996 | Bates |
| 5,601,947 A | 2/1997 | Skotheim et al. |
| 5,648,187 A | 7/1997 | Skothiem et al. |
| 5,681,615 A | 10/1997 | Affinito et al. |
| 5,690,702 A | 11/1997 | Skotheim et al. |
| 5,716,736 A | 2/1998 | Zhang et al. |
| 5,723,230 A | 3/1998 | Naoi et al. |
| 5,731,104 A | 3/1998 | Ventura et al. |
| 5,763,119 A * | 6/1998 | Adachi ............... H01M 10/42 429/199 |
| 5,783,330 A | 6/1998 | Naoi et al. |
| 5,792,575 A | 8/1998 | Naoi et al. |
| 5,824,434 A | 10/1998 | Kawakami et al. |
| 5,834,137 A | 11/1998 | Zhang et al. |
| 5,882,819 A | 3/1999 | Naoi et al. |
| 5,961,672 A | 10/1999 | Skotheim et al. |
| 6,025,094 A | 2/2000 | Visco et al. |
| 6,066,417 A | 5/2000 | Cho et al. |
| 6,117,590 A | 9/2000 | Skotheim et al. |
| 6,153,337 A | 11/2000 | Carlson et al. |
| 6,156,395 A | 12/2000 | Zhang et al. |
| 6,183,901 B1 | 2/2001 | Ying et al. |
| 6,201,100 B1 | 3/2001 | Gorkovenko et al. |
| 6,202,591 B1 | 3/2001 | Witzman et al. |
| 6,203,947 B1 | 3/2001 | Peled et al. |
| 6,225,002 B1 | 5/2001 | Nimon et al. |
| 6,268,695 B1 | 7/2001 | Affinito |
| 6,276,355 B1 | 8/2001 | Zhang et al. |
| 6,277,514 B1 | 8/2001 | Ying et al. |
| 6,280,882 B1 | 8/2001 | Vallee et al. |
| 6,284,412 B1 | 9/2001 | Minakata et al. |
| 6,328,770 B1 | 12/2001 | Gozdz |
| 6,395,423 B1 | 5/2002 | Kawakami et al. |
| 6,413,645 B1 | 7/2002 | Chu et al. |
| 6,508,921 B1 | 1/2003 | Mu et al. |
| 6,517,968 B2 | 1/2003 | Johnson et al. |
| 6,570,325 B2 | 5/2003 | Graff et al. |
| 6,770,187 B1 | 8/2004 | Putter et al. |
| 6,797,428 B1 | 9/2004 | Skotheim et al. |
| 6,835,493 B2 | 12/2004 | Zhang et al. |
| 6,852,139 B2 | 2/2005 | Zhang et al. |
| 6,852,450 B2 | 2/2005 | Hwang et al. |
| 6,886,240 B2 | 5/2005 | Zhang et al. |
| 7,204,862 B1 | 4/2007 | Zhang et al. |
| 7,247,408 B2 | 7/2007 | Skotheim et al. |
| 7,553,590 B2 | 6/2009 | Mikhaylik |
| 7,695,861 B2 | 4/2010 | Kolosnitsyn et al. |
| 8,105,717 B2 | 1/2012 | Skotheim et al. |
| 8,197,971 B2 | 6/2012 | Skotheim et al. |
| 8,415,054 B2 | 4/2013 | Skotheim et al. |
| 8,617,748 B2 | 12/2013 | Mikhaylik et al. |
| 10,629,954 B2 | 4/2020 | Mikhaylik et al. |
| 2001/0041294 A1 | 11/2001 | Chu et al. |
| 2002/0012846 A1 | 1/2002 | Skotheim et al. |
| 2002/0034688 A1 | 3/2002 | Chu et al. |
| 2002/0039680 A1* | 4/2002 | Hwang ............... H01M 4/136 429/218.1 |
| 2002/0045102 A1 | 4/2002 | Jung et al. |
| 2002/0071989 A1 | 6/2002 | Verma |
| 2002/0119371 A1 | 8/2002 | Haug et al. |
| 2002/0197536 A1 | 12/2002 | Mori et al. |
| 2003/0224234 A1 | 12/2003 | Steele et al. |
| 2004/0009393 A1 | 1/2004 | Kim et al. |
| 2004/0048164 A1 | 3/2004 | Jung et al. |
| 2004/0101753 A1 | 5/2004 | Hwang |
| 2004/0175621 A1 | 9/2004 | Iriyama et al. |
| 2004/0191629 A1* | 9/2004 | Itaya ............... H01M 4/386 429/231.95 |
| 2004/0197641 A1 | 10/2004 | Visco et al. |
| 2004/0214088 A1 | 10/2004 | Lee et al. |
| 2005/0051763 A1 | 3/2005 | Affinito et al. |
| 2005/0089757 A1 | 4/2005 | Bannai et al. |
| 2005/0100793 A1 | 5/2005 | Jonghe et al. |
| 2005/0131126 A1 | 6/2005 | Yang et al. |
| 2005/0156575 A1 | 7/2005 | Mikhaylik |
| 2005/0186469 A1 | 8/2005 | De Jonghe et al. |
| 2005/0196677 A1 | 9/2005 | Lee et al. |
| 2005/0208353 A1 | 9/2005 | Johnson |
| 2005/0244715 A1 | 11/2005 | Cho et al. |
| 2006/0057464 A1 | 3/2006 | Kim et al. |
| 2006/0222954 A1 | 10/2006 | Skotheim |
| 2006/0234126 A1 | 10/2006 | Kolosnitsyn et al. |
| 2006/0246354 A1 | 11/2006 | Lee et al. |
| 2007/0117007 A1 | 5/2007 | Visco et al. |
| 2007/0172739 A1 | 7/2007 | Visco |
| 2007/0212583 A1 | 9/2007 | Johnson |
| 2007/0221265 A1 | 9/2007 | Affinito et al. |
| 2008/0014501 A1 | 1/2008 | Skotheim et al. |
| 2008/0057397 A1 | 3/2008 | Skotheim et al. |

(56) References Cited

U.S. PATENT DOCUMENTS

| | | |
|---|---|---|
| 2008/0070087 A1 | 3/2008 | Johnson |
| 2008/0076029 A1 | 3/2008 | Bowden et al. |
| 2008/0213672 A1 | 9/2008 | Skotheim et al. |
| 2010/0104948 A1 | 4/2010 | Skotheim et al. |
| 2011/0014524 A1 | 1/2011 | Skotheim et al. |
| 2011/0159376 A1 | 6/2011 | Skotheim et al. |
| 2011/0165471 A9 | 7/2011 | Skotheim et al. |
| 2011/0200868 A1 | 8/2011 | Klaassen |
| 2012/0276449 A1 | 11/2012 | Skotheim et al. |

FOREIGN PATENT DOCUMENTS

| | | |
|---|---|---|
| JP | 63-126156 A | 5/1988 |
| JP | 4-028172 A | 4/1992 |
| JP | 6-030246 A | 2/1994 |
| JP | 09-279357 A | 10/1997 |
| JP | 2002-075446 A | 3/2002 |
| JP | 2003-059535 A | 2/2003 |
| JP | 2003-077461 A | 3/2003 |
| JP | 2003-515892 A | 5/2003 |
| JP | 2003-217574 A | 7/2003 |
| JP | 2003-303618 A | 10/2003 |
| JP | 2004-087251 A | 3/2004 |
| JP | 2004-527888 A | 9/2004 |
| JP | 2005-108438 A | 4/2005 |
| JP | 2005-174924 A | 6/2005 |
| JP | 2005-216787 A | 8/2005 |
| JP | 2006-503416 A | 1/2006 |
| JP | 2007-513464 A | 5/2007 |
| JP | 2008-535154 A | 8/2008 |
| KR | 2001-0024927 A | 11/2002 |
| WO | WO 97/01870 A1 | 1/1997 |
| WO | WO 97/044840 A1 | 11/1997 |
| WO | WO 99/19931 A1 | 4/1999 |
| WO | WO 99/033125 A1 | 7/1999 |
| WO | WO 99/57770 A1 | 11/1999 |
| WO | WO 01/33651 A1 | 5/2001 |
| WO | WO 01/039302 A1 | 5/2001 |
| WO | WO 01/39303 A1 | 5/2001 |
| WO | WO 01/97304 A1 | 12/2001 |
| WO | WO 02/071989 A1 | 9/2002 |
| WO | WO 02/095849 A2 | 11/2002 |
| WO | WO 03/100888 A1 | 12/2003 |
| WO | WO 04/036669 A2 | 4/2004 |
| WO | WO 05/038953 A2 | 4/2005 |

OTHER PUBLICATIONS

International Preliminary Report on Patentability dated Jun. 10, 2009 for PCT/US2007/024805.
PCT/US2007/024805, Mar. 6, 2008, International Search Report and Written Opinion.
PCT/US2007/024805, Jun. 10, 2009, International Preliminary Report on Patentability.

\* cited by examiner

SEPARATION OF ELECTROLYTES

RELATED APPLICATIONS

This application is a continuation of U.S. application Ser. No. 14/078,648, filed Nov. 13, 2013, which is a continuation of U.S. application Ser. No. 12/312,764 (now U.S. Pat. No. 8,617,748), filed Feb. 2, 2010, which is a U.S. National Stage patent application based on International Application PCT/US2007/024805, filed Dec. 4, 2007, which claims priority to U.S. Provisional Application No. 60/872,939, filed Dec. 4, 2006, each of which is incorporated herein by reference in its entirety.

FIELD OF INVENTION

The present invention relates generally to lithium batteries, and more specifically, to separation of electrolyte compositions within lithium batteries.

BACKGROUND

There has been considerable interest in recent years in developing high energy density batteries with lithium containing anodes. Typical rechargeable batteries of this type include an anode with lithium metal as the active anode species or a lithium intercalation compound as the active anode species. Many of these batteries include a cathode including sulfur as the active cathode species.

Upon charging rechargeable batteries of this type, lithium ion is reduced to lithium metal at the anode while, at the cathode, lithium sulfide species are oxidized to form sulfur. Sulfur generated in this process is incorporated into other sulfur defining a portion of the cathode. Lithium ion is released into an electrolyte connecting the cathode with the anode. Upon discharge, lithium metal at the anode is oxidized to lithium ion, which is released into the electrolyte, while at the cathode lithium ion and sulfur engage in a reduction reaction to form a lithium sulfide species.

Batteries of this type are particularly attractive in terms of weight and energy density, especially those including lithium metal as an active anode species. Lithium metal anodes, or those comprising mainly lithium metal, provide an opportunity to construct cells that are lighter in weight, and which have a higher energy density than cells such as lithium-ion, nickel metal hydride or nickel-cadmium cells. These features are highly desirable for batteries for portable electronic devices such as cellular phones and laptop computers where a premium is paid for low weight.

As noted above, lithium polysulfide species (also referred to herein as "polysulfides") play a role in the chemistry of such batteries. Upon discharge, lithium polysulfide species are formed during a reduction reaction at the sulfur cathode, involving lithium ion from the electrolyte. As is also known, a shuttle mechanism can exist in batteries of this type involving oxidation and reduction of lithium sulfides from higher-order species containing more sulfur to lower-order species containing less sulfur, for example, $Li_2S$.

In some rechargeable lithium batteries of this type, the use of a single electrolyte is not optimal for both the anode and cathode, e.g., high sulfur cathode performance may be achieved, but at the expense of lithium anode cycle-ability and stability. For instance, to obtain better sulfur cathode performance, rate capability, and sulfur utilization, a suitable electrolyte that can dissolve polysulfides at high concentrations may be chosen. However, such an electrolyte, in addition to the dissolved polysulfides in the electrolyte, may cause lithium anode corrosion. On the other hand, when an electrolyte that is less reactive towards the lithium anode is used, polysulfide solubility in such an electrolyte may be relatively poor. This can cause buildup of insoluble polysulfides (i.e., "slate") at the cathode, which can result in poorer device performance and/or shorter device life. Accordingly, methods and devices involving electrolytes that are favorable towards both the anode and cathode would be desirable.

SUMMARY OF THE INVENTION

Methods and articles relating to separation of electrolyte compositions within electrochemical devices, including lithium batteries, are provided.

In one embodiment, a lithium battery is provided. The lithium battery comprises an anode comprising lithium (e.g., lithium metal, a lithium intercalation compound, or a lithium alloy) as the active anode species, a cathode comprising an active cathode species supported by a cathode current collector, and a heterogeneous electrolyte between the anode and the cathode current collector. The heterogeneous electrolyte comprises a first electrolyte solvent and a second electrolyte solvent, wherein, in use, the first electrolyte solvent is present disproportionately at the anode, and the second electrolyte solvent is present disproportionately at the cathode, wherein the second electrolyte solvent includes at least one species which reacts adversely with the anode.

In another embodiment, a method of forming a lithium battery is provided. The method comprises providing an anode comprising lithium (e.g., lithium metal, a lithium intercalation compound, or a lithium alloy) as the active anode species, depositing a mixture comprising a polymer and a first electrolyte solvent on the anode, positioning a cathode such that the mixture is between the anode and cathode, exposing the cathode to a second electrolyte solvent, and allowing at least portions of the first and second electrolyte solvents to be partitioned within the battery.

In another embodiment, a method of operating a lithium battery is provided. The method comprises operating a lithium battery comprising an anode comprising lithium (e.g., lithium metal, a lithium intercalation compound, or a lithium alloy) as the active anode species, a cathode, and an electrolyte comprising at least first and second electrolyte solvents, and partitioning at least portions of the first and second electrolyte solvents such that the first electrolyte solvent is present disproportionately at the anode, and the second electrolyte solvent is present disproportionately at the cathode, wherein the second electrolyte solvent includes at least one species which reacts adversely with the anode.

In another embodiment, a method of forming a lithium battery is provided. The method comprises providing an anode comprising lithium (e.g., lithium metal, a lithium intercalation compound, or a lithium alloy) as the active anode species and depositing a polymer layer on the anode. The polymer layer may be exposed to a first electrolyte solvent. A cathode may be positioned adjacent the anode such that the polymer layer is between the anode and cathode. The cathode may then be exposed to a second electrolyte solvent. At least portions of the first and second electrolyte solvents can be separated within the battery.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
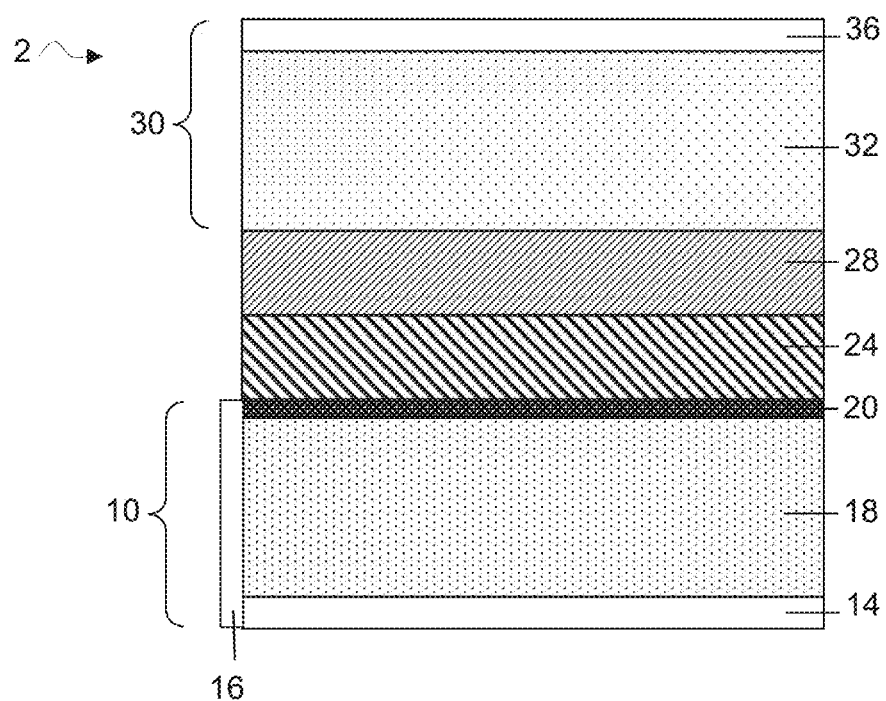
FIG. 1 shows a schematic diagram of a battery that can allow partitioning of two liquid electrolyte solvents, and which includes a separator and a polymer layer associated with the anode, according to one embodiment of the invention.

Methods and articles relating to separation of electrolyte compositions within electrochemical devices, including lithium batteries, are provided. Such separation can result in isolation of a particular species from a portion of the battery, or at least reduction in level of exposure of that portion to the species, for a variety of purposes, including prevention of deposition of certain solids on or within electrodes of devices of this type.

Separation of electrolyte compositions in accordance with the invention can be carried out in a variety of manners. In one set of techniques, a polymer (which can be a gel) is positioned at a location in the device where it is desirable for a particular electrolyte solvent, which has relatively high affinity for the polymer, to reside. In another set of techniques, two different polymers are positioned in the device at particular locations where two different electrolyte solvents, each having a relatively greater affinity for one of the polymers, are desirably positioned. Similar arrangements can be constructed using more than two polymers. Relatively immiscible electrolyte solvents can be used, and positioned relative to each other, and to other components of the device, so as to control exposure of at least one component of the device to a particular species, by exploiting the fact that the species may be more highly soluble in one solvent than the other. Techniques described generally above, or other techniques, or any combination, can be used toward this general separation methodology.

The lithium batteries described herein may include an anode having lithium (e.g., lithium metal, a lithium intercalation compound, or a lithium alloy) as the active anode species and a cathode having sulfur as the active cathode species. Suitable electrolytes for the lithium batteries can comprise a heterogeneous electrolyte including a first electrolyte solvent (e.g., dioxolane (DOL)) that partitions towards the anode and is favorable towards the anode (referred to herein as an "anode-side electrolyte solvent") and a second electrolyte solvent (e.g., 1,2-dimethoxyethane (DME)) that partitions towards the cathode and is favorable towards the cathode (and referred to herein as an "cathode-side electrolyte solvent"). In some embodiments, the anode-side electrolyte solvent has a relatively lower reactivity towards lithium metal and may be less soluble to polysulfides (e.g., $Li_2S_x$, where x>2) than the cathode-side electrolyte solvent. The cathode-side electrolyte solvent may have a relatively higher solubility towards polysulfides, but may be more reactive towards lithium metal. By separating the electrolyte solvents during operation of the battery such that the anode-side electrolyte solvent is present disproportionately at the anode and the cathode-side electrolyte solvent is present disproportionately at the cathode, the battery can benefit from desirable characteristics of both electrolyte solvents (e.g., relatively low lithium reactivity of the anode-side electrolyte solvent and relatively high polysulfide solubility of the cathode-side electrolyte solvent). Specifically, anode consumption can be decreased, buildup of insoluble polysulfides (i.e., "slate", lower-order polysulfides such as $Li_2S_x$, where x<3, e.g., $Li_2S_2$ and $Li_2S$) at the cathode can be decreased, and as a result, the battery may have a longer cycle life. Furthermore, the batteries described herein may have a high specific energy (e.g., greater than 400 Wh/kg), improved safety, and/or may be operable at a wide range of temperatures (e.g., from −70° C. to +75° C.). Disproportionate presence of one species or solvent, verses another, at a particular location in a cell means that the first species or solvent is present, at that location (e.g., at a surface of a cell electrode) in at least a 2:1 molar or weight ratio, or even a 5:1, 10:1, 50:1, or 100:1 or greater ratio.

In most embodiments described herein, lithium rechargeable batteries (including lithium anodes) are described. However, wherever lithium batteries are described herein, it is to be understood that any analogous alkali metal battery (alkali metal anode) can be used, as described in more detail below. Additionally, wherever cathodes including sulfur as an active cathode species are described herein, it is to be understood that any suitable cathode active species can be used. Furthermore, although rechargeable batteries are primarily disclosed herein, non-rechargeable (primary) batteries are intended to benefit from the invention as well.

As used herein, a "heterogeneous electrolyte" is an electrolyte including at least two different liquid solvents (oftentimes referred to herein as first and second electrolyte solvents, or anode-side and cathode-side electrolyte solvents). The two different liquid solvents may be miscible or immiscible with one another, although in many aspects of the invention, electrolyte systems include one or more solvents that are immiscible (or can be made immiscible within the cell) to the extent that they will largely separate and at least one can be isolated from at least one component of the cell. A heterogeneous electrolyte may be in the form of a liquid, a gel, or a combination thereof. Specific examples of heterogeneous electrolytes are provided below.

As certain embodiments described herein involve a heterogeneous electrolyte having at least two electrolyte solvents that can partition during operation of the battery, one object of the invention is to prevent or decrease the likelihood of spontaneous solvent mixing, i.e., generation of an emulsion of two immiscible liquids. As described in more detail below, this may be achieved in some embodiments by "immobilizing" at least one electrolyte solvent at an electrode (e.g., an anode) by forming, for example, a polymer gel electrolyte, glassy-state polymer, or a higher viscosity liquid that resides disproportionately at that electrode.

FIG. 1 shows an example of a lithium battery that can allow or cause separation/partitioning of a heterogeneous electrolyte according to one embodiment of the invention. In the embodiment illustrated in FIG. 1, battery 2 includes anode 10 comprising an active anode material layer 18 (e.g., lithium metal). In some cases herein, the anode is referred to as an "anode based material," "anode active material," or the like, and the anode along with any protective structures are referred to collectively as the "anode." All such descriptions are to be understood to form part of the invention. The active anode material layer 18 may be supported by substrate 14, which may act as an anode current collector. Additionally and/or alternatively, an edge current collector 16 may be present. In some cases, the active anode material layer is self-supporting (e.g., in the form of a lithium foil) and substrate 14 is not needed. A protective layer 20 may be supported by the active anode material. In some embodiments, protective layer 20 may be a single ion conducting layer, i.e., a polymeric, ceramic, or metallic layer that allows certain ions (e.g., Lit) to pass therethrough, while impeding the passage of other components that may otherwise damage the anode. Alternatively, the protective layer may be a temporary protective layer, i.e., it may be capable of forming an alloy with lithium metal, or is capable of diffusing into, dissolving into, and/or blending with lithium metal, e.g., during electrochemical cycling of the cell and/or prior to electrochemical cycling of the cell. In other embodiments, an anode may include both a single ion conducting layer and a protective layer, or in other embodiments, the anode may not have either. In the illustrative embodiment of FIG. 1, the battery also includes a polymer layer 24 at the anode. The polymer layer can, in some instances, be in the form of a polymer gel or a glassy-state polymer. The polymer layer may have an affinity to one electrolyte solvent of a heterogeneous electrolyte such that during operation of the battery, one electrolyte solvent resides disproportionately at the anode, while the other electrolyte solvent is substantially excluded from the polymer layer and is present disproportionately at the cathode. Also illustrated in FIG. 1 is a separator 28, which can permit the transport of ions between the anode and the cathode. Cathode 30 may include an active cathode material 32 (e.g., sulfur) disposed on a substrate 36, which can act as a cathode current collector.

As described herein, in some embodiments, the use of a single electrolyte in the battery is not optimal for both the anode and cathode. For instance, an electrolyte including the solvent dioxolane generally has relatively low reactivity towards lithium and has good lithium ion conductivity, but has relatively low polysulfide solubility compared to certain solvents such as 1,2-dimethoxyethane. Thus, batteries including dioxolane as the electrolyte solvent may have buildup of insoluble polysulfides at the cathode, which can result in poor cathode performance. On the other hand, other electrolyte solvents such as 1,2-dimethoxyethane have relatively high polysulfide solubility but are more reactive towards lithium metal, and, therefore, can cause corrosion of the anode and/or poor lithium morphology. Accordingly, in some embodiments, batteries described herein include a heterogeneous electrolyte comprising at least a first electrolyte solvent and a second electrolyte solvent, wherein the first electrolyte solvent, which has characteristics that are more favorable towards the anode, is present disproportionately at the anode during operation of the battery, and the second electrolyte solvent, which has characteristics that are more favorable towards the cathode, is present disproportionately at the cathode. For instance, in one embodiment, the first electrolyte solvent is present substantially in polymer layer 24 (e.g., the first electrolyte solvent together with a polymer may form a gel polymer electrolyte). Because the first electrolyte solvent is present closer to the anode, it is generally chosen to have one or more characteristics such as low reactivity to lithium (e.g., enable high lithium cycleability), reasonable lithium ion conductivity, and relatively lower polysulfide solubility than the second electrolyte solvent (since polysulfides can react with lithium). The second electrolyte solvent may be present disproportionately at the cathode and, for example, may reside substantially in separator 28 and/or in cathode active material layer 32. In some instances, the second electrolyte solvent is essentially free of contact with the anode. The second electrolyte solvent may have characteristics that favor better cathode performance such as high polysulfide solubility, high rate capability, high sulfur utilization, and high lithium ion conductivity, and may have a wide liquid state temperature range. In some cases, the second electrolyte solvent has a higher reactivity to lithium than the first electrolyte solvent. It may be desirable, therefore, to cause the second electrolyte solvent to be present at the cathode (i.e., away from the anode) during operation of the battery, thereby effectively reducing it's concentration, and reactivity, at the anode.

Advantageously, separating liquid polysulfides from the anode may have a significant impact on safety. The following factors may contribute to safety improvement. First, cell venting and drying at elevated temperatures may lead to little or none elemental sulfur precipitation on the lithium anode surface, which can cause sporadic "hot spots". Second, the anode-side solvent may comprise higher boiling solvents that may not completely evaporate; this can result in better total heat distribution and dissipation. The cathode side can still utilize solvents having a low boiling point and/or low viscosity, which is favorable for cathode rate capability. Third, if an anode side electrolyte is at least partially immobilized at the anode (in the form of a gel), even lower solvent evaporation rates can be obtained.

Fourth, improved lithium surface morphology can lead to overall reduction in lithium surface reactivity. Better lithium morphology means longer anode cycle life, lower reactivity with solvents (lower solvent depletion) and lower cell swelling due to morphology development.

By including a heterogeneous electrolyte in the battery and partitioning the first and second solvents towards the respective electrodes during use, solvents that would have otherwise been disfavored because of its negative effect towards one electrode can be used. Furthermore, heterogeneous electrolytes used with batteries described herein can have a wide range of different electrolyte solvent combinations.

As described above, the first electrolyte solvent of a heterogeneous electrolyte may be present disproportionately at the anode by residing in polymer layer 24. Accordingly, the material composition of the polymer layer may be chosen such that the polymer has a relatively higher affinity to (high solubility in) the first electrolyte solvent compared to the second electrolyte solvent. For instance, in some embodiments, the polymer layer is prepared in the form of a gel by mixing a monomer, a first electrolyte solvent, and optionally other components (e.g., a crosslinking agent, lithium salts, etc.) and disposing this mixture on the anode. The monomer can be polymerized by various methods (e.g., using a radical initiator, ultra violet radiation, an electron beam, or catalyst (e.g., an acid, base, or transition metal catalyst)) to form a gel electrolyte. Polymerization may take place either before or after disposing the mixture on the anode. After assembling the other components of the battery, the battery can be filled with the second electrolyte solvent. The second electrolyte solvent may be excluded from the polymer layer (e.g., due to the high affinity of the polymer with the first electrolyte solvent already present in the polymer layer and/or due to immiscibility between the first and second electrolyte solvents), and the second electrolyte solvent may fill the spaces (e.g., pores) within the separator and/or the cathode. In some embodiments, the cathode can be dried prior to assembly of the battery to facilitate this process. Additionally and/or alternatively, the cathode may include a polymer that has a high affinity for the second electrolyte solvent.

In another embodiment, the polymer layer is formed at the anode and is dried prior to assembly of the battery. The battery can then be filled with a heterogeneous electrolyte including the first and second electrolyte solvents. If the polymer layer is chosen such that it has a higher affinity towards the first electrolyte solvent (and/or the separator and/or cathode may have a higher affinity towards the second electrolyte solvent), at least portions of the first and second electrolyte solvents can partition once they are introduced into the battery. In yet another embodiment, partitioning of the first and second electrolyte solvents can take place after commencement of first discharge of the battery. For example, as heat is produced while operating the battery, the affinity between the polymer layer and the first electrolyte solvent can increase (and/or the affinity between the separator and/or cathode and the second electrolyte solvent can increase). Thus, a greater degree of partitioning of the electrolyte solvents can occur during operation of the battery. Additionally, at lower temperatures, the effect may be irreversible such that the first electrolyte solvent is trapped within the polymer layer, and the second electrolyte solvent is trapped within the pores of the separator and/or cathode. In some cases, the components of the battery (e.g., the polymer layer) may be pretreated (e.g., with heat) prior to use to affect the desired degree of polymer/electrolyte solvent interaction. Other methods of partitioning the electrolyte solvents are also possible, as described in more detail below.

In another embodiment, the polymer layer is deposited at the anode and the anode (including the polymer layer) is exposed to a first electrolyte solvent. This exposure can cause the first electrolyte solvent to be absorbed in the polymer. The battery can be formed by positioning a cathode adjacent the anode such that the polymer layer is positioned between the anode and cathode. The cathode can then be exposed to a second electrolyte solvent, e.g., such that at least a portion of the second electrolyte solvent is absorbed in the cathode. In other embodiments, the cathode can be exposed to the second electrolyte solvent prior to assembly of the anode and cathode. Optionally, the cathode may include a polymer layer that preferentially absorbs the second electrolyte solvent more than the first electrolyte solvent. In some embodiments, e.g., by choosing appropriate polymer(s) and/or materials used to form the anode and/or cathode, at least portions of the first and second electrolyte solvents can be separated within the battery. For instance, a higher proportion of the first electrolyte solvent may reside at the anode and a higher proportion of the second electrolyte solvent may reside at the cathode.

It should be understood that not all of the features shown in FIG. 1 need be present in all embodiments of the invention and that the illustrated elements may be otherwise positioned. Also, additional features may be present in other embodiments. Additional embodiments are shown in the other figures and/or described below.

Figure 2:
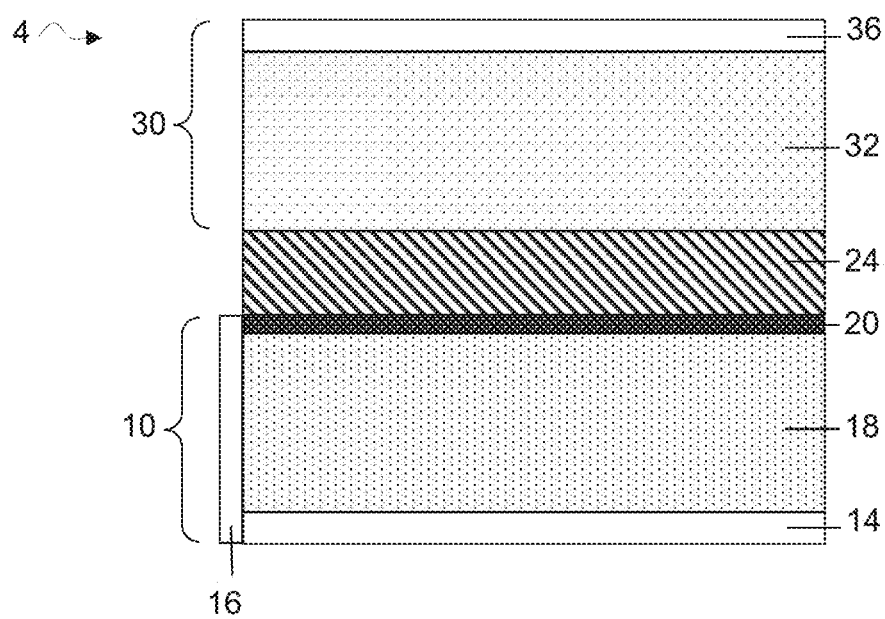
FIG. 2 shows a schematic diagram of a battery that can allow partitioning of two liquid electrolyte solvents, and which includes a polymer layer associated with the anode, according to one embodiment of the invention.

FIG. 2 shows another example of a lithium battery that can cause separation of a heterogeneous electrolyte. As shown in the embodiment illustrated in FIG. 2, battery 4 includes polymer layer 24 at the anode. In such an embodiment, the polymer layer can act as a separator between the anode and cathode. The second electrolyte solvent may be present disproportionately at the cathode by filling the spaces within the cathode. Additionally and/or alternatively, polymer layer 24 may have a different composition near the anode side compared to the cathode side, the anode side having a higher affinity for the first solvent and the cathode side having a higher affinity for the second solvent.

Figure 3:
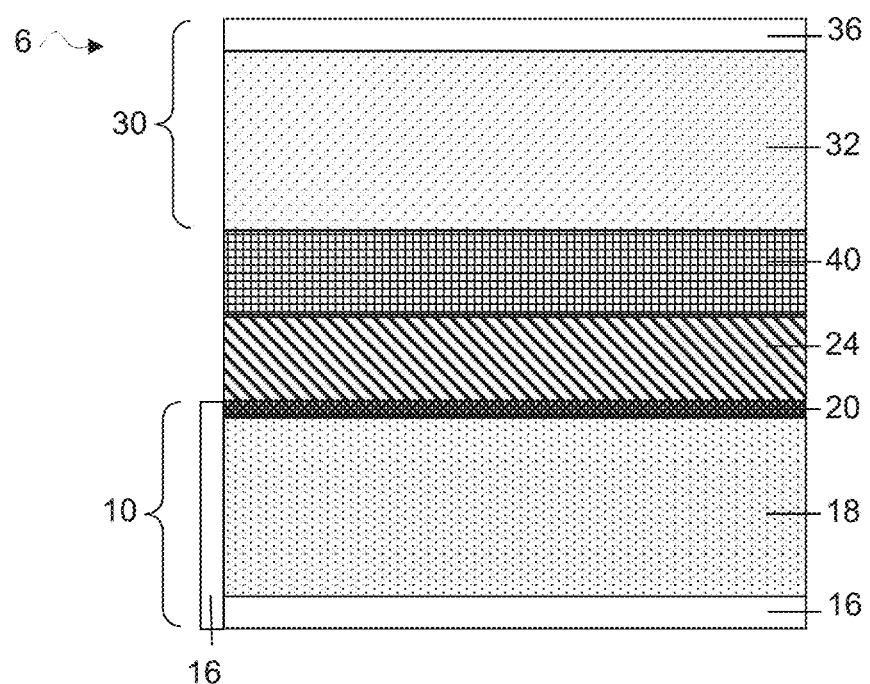
FIG. 3 shows a schematic diagram of a battery that can allow partitioning of two liquid electrolyte solvents, and which includes a polymer layer associated with the anode and a polymer layer associated with the cathode, according to one embodiment of the invention.

In some embodiments, batteries described herein include more than one polymer layer which has an affinity for a particular electrolyte solvent. For example, as shown in the embodiment illustrated in FIG. 3, battery 6 includes a first polymer layer 24 residing at the anode and a second polymer layer 40 residing at the cathode. The first polymer layer can have a high affinity for a first electrolyte solvent that is favorable towards the anode and the second polymer can have a high affinity for a second electrolyte solvent that is favorable towards the cathode.

Figure 4:
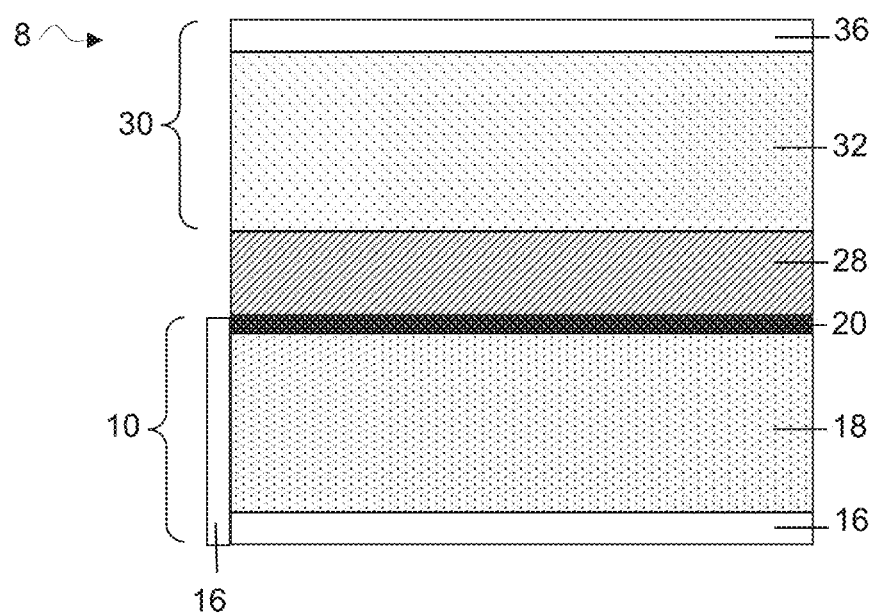
FIG. 4 shows a schematic diagram of a battery that can allow partitioning of two liquid electrolyte solvents, and which includes a separator, according to one embodiment of the invention.

As shown in the embodiment illustrated in FIG. 4, battery 8 does not include a polymer layer at the anode or the cathode. Separator 28 may include a different composition near the anode side compared to the cathode side of the separator, the anode side having a higher affinity for the first solvent and the cathode side having a higher affinity for the second solvent. Additionally and/or alternatively, the second electrolyte solvent may be present disproportionately at the cathode by, for example, fabricating the cathode such that it contains a component that has a high affinity for the second electrolyte solvent, as described further below.

In some of the embodiments described herein, a battery may be filled with a heterogeneous electrolyte including first and second electrolyte solvents and partitioning of the electrolyte solvents can occur after commencement of first discharge of the battery, e.g., due to the differential solubility of the polysulfides in the electrolyte solvents. For example, as more polysulfides are generated during operation of the cell, the dissolution of the polysulfides in the more favorable second electrolyte solvent can cause it to become immiscible with the first. Thus, in some embodiments, the first and second electrolyte solvents may be miscible before, but immiscible after, commencement of first discharge of the battery. The second electrolyte solvent containing the dissolved polysulfides may be present disproportionately at the cathode by, for example, embodiments described herein such as having a polymer layer at the anode that preferentially associates with the first electrolyte solvent, and/or a polymer layer at the cathode that preferentially associates with the second electrolyte solvent. In other embodiments, the first and second electrolyte solvents are miscible before commencement of first discharge of the battery, but the electrolyte solvents become immiscible due to heating of the electrolyte solvents during operation of the battery. In yet other embodiments, the first and second electrolyte solvents are immiscible before and after commencement of first discharge of the battery. For instance, the first and second electrolyte solvents may be inherently immiscible at room temperature, as well as during operation of the battery. Advantageously, in some embodiments, two immiscible liquid electrolyte solvents, one present disproportionately and the anode and the other present disproportionately and the cathode, do not cause additional mechanical stress to the battery as a solid membrane may, during electrode volume changes that occur during cell cycling.

It should be appreciated that batteries described herein are not limited to the configurations shown in FIGS. 1-4; for example, in some embodiments, a battery may include more than one separator having different affinities for the first and second electrolyte solvents. In other embodiments, the batteries shown in FIGS. 1-4 can be combined with a cathode having a structure shown in FIGS. 5-6.

As described above, partitioning of a heterogeneous electrolyte such that a first electrolyte solvent that has characteristics favorable towards the anode (e.g., low reactivity towards lithium, good lithium ion conductivity, and relatively low polysulfide solubility) is present disproportionately at the anode and a second electrolyte solvent that has characteristics favorable towards the cathode (e.g., relatively high polysulfide solubility, and enables high rate capability and high sulfur utilization) is present disproportionately at the cathode can be beneficial to both electrodes. In particular, by maintaining the second electrolyte solvent (which may have relatively high polysulfide solubility) rather than the first electrolyte solvent disproportionately at the cathode, the formation and/or accumulation of unwanted solids (e.g., "slate") at the cathode can be reduced or eliminated. This is especially important at higher sulfur utilization and higher energy density, where this accumulation can become more problematic. Accordingly, in some embodiments, accumulation of unwanted solids is further reduced by including a polymeric material in contact with the cathode, as shown in FIGS. 5-6.

Figure 5:
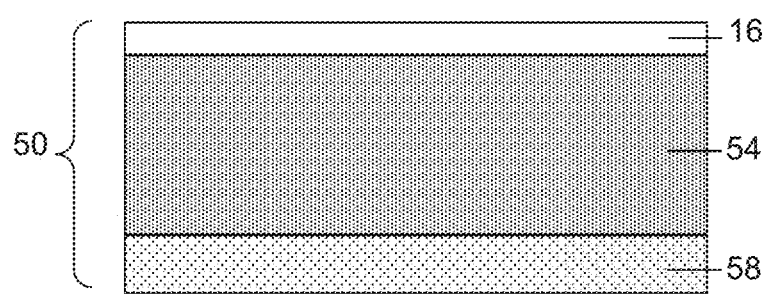
FIG. 5 shows a schematic diagram of a cathode including a polymer layer associated therewith, according to one embodiment of the invention.

FIG. 5 shows cathode 50 including a cathode active material layer 54 supported by substrate 16, which can act as a cathode current collector. The cathode active material layer can support a polymer layer 58 that has a high affinity for a second electrolyte solvent, which favors better cathode performance. Polymer layer 58 may have a low affinity for (e.g., it may exclude) a first electrolyte solvent, which may impede cathode performance. For example, in one embodiment, a battery includes a heterogeneous electrolyte containing a first electrolyte solvent (e.g., DOL) and second electrolyte solvent (e.g., DME), and polymer layer 58 comprises polyvinylidene fluoride (e.g., a polyvinylidene fluoride-hexafluoropropylene copolymer such as PVdF-HFP $\{-CH_2-CF_2-\}_x-\{CF_2-CF(CF_3)-\}$). Such a polymer layer may have a low affinity for DOL, but can dissolve in excess DME (e.g., limited amounts of DME can plasticize the polymer). Thus, incorporation of such a polymer at the cathode can partition a DOL/DME-based heterogeneous electrolyte, preferentially "binding" DME where it is advantageous (e.g., at the cathode) and effectively reducing it's concentration, and reactivity, at the anode. At higher temperatures the effect may be more pronounced; that is, more DME can partition in the cathode. At lower temperatures, however, the effect may not be reversible and the trapped DME may not be expelled form the polymer. Thus, a thermally-stable structure may be produced. Additionally, the polymer layer may be pretreated (e.g., with heat) to affect the desired degree of polymer/electrolyte solvent interaction.

Polymer layer 58 can be positioned at the cathode by any suitable method. In one embodiment, a polymer in powder form can be coated on the cathode and can be formulated as, for example, a dissolved topcoat or as an insoluble powder (e.g., with <5% of soluble binder).

Figure 6:
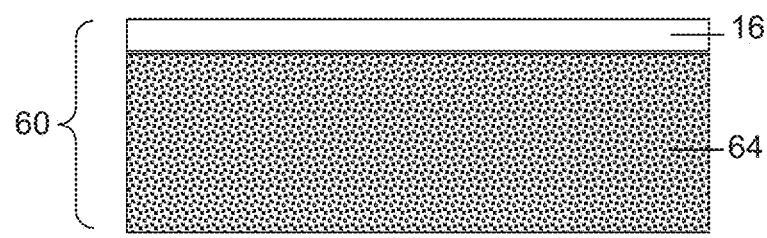
FIG. 6 shows a schematic diagram of a cathode including a polymeric material dispersed within the cathode active material layer, according to one embodiment of the invention.

In some embodiments, such a polymer can be dispersed within the cathode, as shown in FIG. 6. In the embodiment illustrated in FIG. 6, cathode 60 includes cathode active material layer 64 supported by substrate 16, which can act as a cathode current collector. The cathode active material layer may include, for example, a polymeric material in powder form incorporated therein. In some cases, the polymeric material is an insoluble component in layer 64. For example, the polymeric material may be insoluble in the solvent used to dissolve the cathode active material. The polymer can be obtained, or modified, to have a suitable particle size and dispersed throughout the cathode by incorporation in the cathode slurry. One advantage of incorporating an insoluble polymer with the cathode active material layer is that the polymer can remain as discrete particles that do not coat, adsorb, and/or block the active carbon sites. In other cases, however, the polymeric material can be dissolved, or partially dissolved, as the cathode binder in layer 64.

In embodiments described herein, a layer (e.g., structure, region, or portion) referred to as being "supported by" or "supporting" another layer means that it lies substantially vertically above or below the layer, respectively. When a layer is "supported by", "above", "on", "over", or "overlying" another portion, it can be directly on the layer, or an intervening layer (e.g., structure, region, or portion) also may be present. Similarly, when a layer is "below" or "underneath" another layer, it can be directly below the layer, or an intervening layer (e.g., structure, region, or portion) also may be present. A layer that is "directly supported by", "directly on", or "in contact with" another layer means that no intervening layer is present. It should also be understood that when a layer is referred to as being "above", "on", "over", "overlying", "in contact with", "below", or "supported by" another layer, it may cover the entire layer or a part of the layer.

As described in several embodiments of the invention, a battery may include a polymeric material (e.g. in the form of a layer) at the anode that has a high affinity for a first electrolyte solvent, and/or a polymeric material at the cathode that has a high affinity for a second electrolyte solvent. The type of polymeric may be chosen based on, for example, the degree of relative solubility of the polymeric material in a particular electrolyte solvent, the mechanical properties of the polymer, the choice of electrolyte solvents, the reactivity of the polymer to the anode or cathode, polysulfide chemical stability, the degree of polysulfide solubility in the polymer (e.g., relatively high polysulfide solubility for a polymer at the cathode; relatively low polysulfide solubility for a polymer at the anode), etc. Generally, a polymeric material that has a high affinity for a solvent also has a solubility in the solvent and, therefore, will swell in the presence of the solvent. Accordingly, the degree of relative solubility of a polymer in two particular solvents can be determined by those of ordinary skill in the art by, for example, swelling measurements. For instance, the same polymeric material may be immersed in excess of a first solvent and in excess of a second solvent (wherein the solvents are in different containers), and after equilibrium swelling has be reached, the polymeric material that swelled the most in a particular solvent has a higher solubility, and thus, a higher affinity, to that solvent.

Relative solubility may also be determined by comparing the solubility parameter $\delta$ ($cal^{1/2}\ cm^{-3/2}$), which is based on the cohesive energy densities, c ($cal/cm^3$), of the materials. Generally, for many types of materials, materials having similar solubility parameters are more soluble in one another than two materials having very different solubility parameters. For instance, dioxolane has a solubility of $\delta=11.3$ $cal^{1/2}\ cm^{-3/2}$ and 1,2-dimethoxyethane has a solubility of $\delta=8.8\ cal^{1/2}\ cm^{-3/2}$. If a polymer such as PVdF is used (e.g., at the cathode), PVdF may have a higher affinity towards 1,2-dimethoxyethane than dioxolane since PVdF has a solubility of $\delta=6.6\ cal^{1/2}\ cm^{-3/2}$; therefore, dioxolane may be excluded from a cathode that is associated with PVdF.

Thus, in some embodiments, electrolyte solvents and/or polymers can be chosen such that the first electrolyte solvent has a solubility $\delta_1$, a second electrolyte solvent has a solubility $\delta_2$, a polymeric material in contact with the anode has a solubility $\delta_3$, and $|\delta_1-\delta_3|<|\delta_2-\delta_3|$. In other words, the first electrolyte solvent can be present predominately at the anode by preferentially associating with the polymeric material to a greater extent than the second solvent. Similarly, to choose a suitable polymer (having a solubility parameter $\delta_4$) for the cathode that has a higher affinity for a second electrolyte solvent than a first electrolyte solvent, one can choose solvents such that $|\delta_1-\delta_4|>|\delta_2-\delta_4|$. In some embodiments, electrolyte solvents and/or polymers can be chosen such that $\||\delta_1-\delta_3|-|\delta_2-\delta_3|\|$ or $\||\delta_1-\delta_4|-|\delta_2-\delta_4|\|$ is greater than or equal to 1, greater than or equal to 2, greater than or equal to 4, greater than or equal to 6, or greater than or equal to 8 $cal^{1/2}\ cm^{-3/2}$. Solubility parameters for many solvents and polymers are known (see, for example, Mark, J. E.; Eisenberg, A.; Graessley, W. W.; Mandelkern, L.; Koenig, J. L., *Physical Properties of Polymers*; American Chemical Society: Washington D.C., 1984 and Du, Y.; Xue, Y.; Frisch, H. L. *Physical Properties of Polymers Handbook*; AIP Press: Woodbury, N.Y., 1996) or can be determined by those of ordinary skill in the art. In addition, phase diagrams can be used to evaluate relative solubility of electrolyte solvents.

Polymeric materials can also be selected or formulated to have suitable physical/mechanical characteristics by, for example, tailoring the amounts of components of polymer blends, adjusting the degree of cross-linking (if any), etc. Those of ordinary skill in the art can readily select, or formulate, such polymeric materials.

Classes polymers that may be suitable for use in a polymer layer include, but are not limited to, polyamines (e.g., poly(ethylene imine) and polypropylene imine (PPI)); polyamides (e.g., polyamide (Nylon), poly($\epsilon$-caprolactam) (Nylon 6), poly(hexamethylene adipamide) (Nylon 66)), polyimides (e.g., polyimide, polynitrile, and poly(pyromellitimide-1,4-diphenyl ether) (Kapton)); vinyl polymers (e.g., polyacrylamide, poly(2-vinyl pyridine), poly(N-vinylpyrrolidone), poly(methylcyanoacrylate), poly(ethylcyanoacrylate), poly(butylcyanoacrylate), poly(isobutylcyanoacrylate), poly(vinyl acetate), poly (vinyl alcohol), poly(vinyl chloride), poly(vinyl fluoride), poly(2-vinyl pyridine), polychlorotrifluoro ethylene, poly(isohexylcynaoacrylate), polyisobutylene, poly(methyl styrene), poly(methylmethacrylate) (PMMA), polyethylacrylate, polymethylmethacrylate, and polyethylmethacrylate); polyacetals; polyolefins (e.g., poly(butene-1), poly(n-pentene-2), polypropylene, polytetrafluoroethylene); polyesters (e.g., polycarbonate, polybutylene terephthalate, polyhydroxybutyrate); polyethers (poly (ethylene oxide) (PEO), poly(propylene oxide) (PPO), poly (tetramethylene oxide) (PTMO)); polyaramides (e.g., poly (imino-1,3-phenylene iminoisophthaloyl) and poly(imino-1, 4-phenylene iminoterephthaloyl)); polyheteroaromatic compounds (e.g., polybenzimidazole (PBI), polybenzobisoxazole (PBO) and polybenzobisthiazole (PBT)); polyheterocyclic compounds (e.g., polypyrrole); polyurethanes; phenolic polymers (e.g., phenol-formaldehyde); polyalkynes (e.g., polyacetylene); polydienes (e.g., 1,2-polybutadiene, cis or trans-1,4-polybutadiene); polysiloxanes (e.g., poly(dimethylsiloxane) (PDMS), poly(diethylsiloxane) (PDES), polydiphenylsiloxane (PDPS), and polymethylphenylsiloxane (PMPS)); and inorganic polymers (e.g., polyphosphazene, polyphosphonate, polysilanes, polysilazanes). The mechanical and electronic properties (e.g., conductivity, resistivity) of these polymers are known. Accordingly, those of ordinary skill in the art can choose suitable polymers for use in lithium batteries, e.g., based on their mechanical and/or electronic properties (e.g., ionic and/or electronic conductivity), and/or can modify such polymers to be ionically conducting (e.g., conductive towards single ions) and/or to exclude certain solvents based on knowledge in the art, in combination with the description herein. For example, the polymer materials listed above may further comprise salts, for example, lithium salts, e.g., LiSCN, LiBr, LiI, LiClO$_4$, LiAsF$_6$, LiSO$_3$CF$_3$, LiSO$_3$CH$_3$, LiBF$_4$, LiB (Ph)$_4$, LiPF$_6$, LiC(SO$_2$CF$_3$)$_3$, and LiN(SO$_2$CF$_3$)$_2$, to enhance ionic conductivity.

As described above, a particular type of polymer (or monomer) may be chosen at least in part by where the polymer is to be positioned in the battery, e.g., at the anode or at the cathode. In some embodiments, a monomer that is suitable for a layer being positioned at the anode includes, but is not limited to, an unsaturated compound having a limited solubility of lithium polysulfides and having the general formula CH$_2$=CH—R, where R can be an alkyl, aryl, substituted aryl (alkyl, aryl, alkoxy, carbonyl, carboxy, carbalkoxy, amino, amido, thio or a combination thereof), heteroaryl (sulfur, oxygen, nitrogen, phosphorus or a combination thereof), carbonyl, carboxy, carbalkoxy, amino, amido, thio, or a combination thereof. In some embodiments, such a monomer does not include ester groups and/or halogen groups. Polymerization can be initiated by any suitable method, such as using a radical initiator, heat, UV, electron beam, or an acid, base or transition metal catalyst. Monomers can also be crosslinked, if desired, with any suitable crosslinker, such as aziridines, divinyibezene, diacrylates, dimethacrylates, divinyl ethers, and other molecules having two or more double or triple bonds.

In embodiments described herein including one or more polymer layer(s) in contact with the anode or cathode, the polymer layer(s) may optionally comprise a filler. The filler may be dispersed within the polymer, may be added as a layer on the polymer, and/or may fill any pores in the polymer. The filler may comprise, for example, a metal, a polymer, or a ceramic. In one embodiment, the filler is a heterogeneous insoluble material. The filler may comprise, in some embodiments, a metal oxide, an oxy-hydroxide, a sulfide, a nitride, or a combination thereof. For example, the filler may include one or more of $Al_2O_3$, AlOOH, $SiO_2$, AN, BN, and $Li_3N$.

In some embodiments, a single polymer layer is in contact with an anode or cathode of a battery; however, in other embodiments, more than one polymer layer can be associated with an anode or cathode. For instance, a polymer layer in contact with an anode (or cathode) may be formed of more than one polymer layer coated in sequence. The sequence of polymers may include, for example, a first polymer and a second polymer, the first and second polymers being the same or different. Additional polymers, e.g., fourth, fifth, or sixth polymer layers, can also be used. Each of the polymer layers may optionally include one or more fillers.

The thickness of a polymer layer may vary, e.g., over a range from about 0.1 microns to about 100 microns. The thickness of the polymer layer may depend on, for example, whether it is positioned adjacent the anode or cathode, whether a separator is also present in the battery, and/or the number of polymer layers in the battery. For instance, the thickness of the polymer layer may be between 0.1-1 microns thick, between 1-5 microns thick, between 5-10 microns thick, between 10-30 microns thick, or between 30-50 microns thick, between 50-70 microns thick, or between 50-100 microns thick. In some embodiments, the thickness of a polymer layer may be no greater than, e.g., 50 microns thick, no greater than 25 microns thick, no greater than 10 microns thick, no greater than 5 microns thick, no greater than 2.5 microns thick, no greater than 1 micron thick, no greater than 0.5 microns thick, or no greater than 0.1 microns thick.

Polymer layers described herein may be deposited by any of a variety of methods generally known in the art, and, if desired, dried using techniques known in the art. In some embodiments, a polymer layer is formed by depositing a mixture of a monomer and a solvent (e.g., an electrolyte solvent), optionally including other components such as crosslinking agents, lithium salts, etc., onto an electrode surface. The mixture may then be polymerized and/or crosslinked to form a polymer gel. In other embodiments, the mixture can be polymerized and/or crosslinked prior to being deposited onto an electrode surface. Suitable hand coating techniques for depositing a polymer on a surface include, but are not limited to, the use of a coating rod or gap coating bar. Suitable machine coating methods include, but are not limited to, the use of roller coating, gravure coating, slot extrusion coating, curtain coating, and bead coating. Polymer layers can also be spin-coated onto a surface. Web coating can also be employed. If removal of some or all of the solvent from a polymer/mixture is desired, this can be accomplished by any of a variety of methods known in the art. Examples of suitable methods for the removal of solvents from the mixture include, but are not limited to, hot air convection, heat, infrared radiation, flowing gases, vacuum, reduced pressure, extraction, and by simply air drying.

In certain embodiments including one or more polymers dispersed within a layer (e.g., insoluble polymeric particles dispersed in a cathode), the polymers can have any suitable particle size. The average diameter of the polymer particles may be, for example, less than or equal to 100 microns, less than or equal to 70 microns, less than or equal to 50 microns, less than or equal to 30 microns, less than or equal to 15 microns, less than or equal to 10 microns, or less than or equal to 5 microns. Of course, a range of polymer particle sizes may be used. For example, in one embodiment, the polymer particles may have a size of d10=5, d50=12, and d97=55 microns, meaning 10% of the particles were below 5 microns, 50% of the particles below 12 microns, and only 3% of the particles measured above 55 microns.

Drying and/or crosslinking may be performed at a range of temperatures. Suitable temperatures are those above which the liquid medium becomes volatile, typically above the boiling point, and also above which the crosslinking reaction between appropriate groups and the crosslinking agent occurs at an acceptable rate. Suitable temperatures are also below those at which the conductive support, for example, a metallized plastic film, may be deformed or damaged. In some embodiments, the drying and crosslinking step is performed at a temperature of from about 60-170 degrees Celsius.

The electrolytes used in batteries can function as a medium for the storage and transport of ions, and in the special case of gel electrolytes, these materials may additionally function as a separator between the anode and the cathode. As noted, in one set of embodiments a heterogeneous electrolyte is used. Any liquid or gel material capable of storing and transporting ions (e.g., lithium ions for a lithium battery) may be used, including a combination of liquids, a combination of liquid(s) and a polymer, etc., so long as the material(s) facilitates the transport of lithium ions between the anode and the cathode. The electrolyte may be electronically non-conductive to prevent short circuiting between the anode and the cathode.

As described above, in some embodiments, an electrolyte includes at least a first electrolyte solvent that is favorable towards the anode and a second electrolyte solvent that is favorable towards the cathode. The first and second electrolyte solvents may be chosen such that they can be partitioned, e.g., the first electrolyte solvent may be present disproportionately at the anode and the second electrolyte solvent may be present disproportionately at the cathode (e.g., during operation of the battery) and/or based on other factors described herein. Examples of useful liquid electrolyte solvents include, but are not limited to, non-aqueous organic solvents, such as, for example, N-methyl acetamide, acetonitrile, acetals, ketals, esters, carbonates, sulfones, sulfites, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

In some embodiments, specific liquid electrolyte solvents that may be favorable towards the anode (e.g., have relatively low reactivity towards lithium, good lithium ion conductivity, and/or relatively low polysulfide solubility) include, but are not limited to 1,1-dimethoxyethane (1,1-DME), 1,1-diethoxyethane, 1,2-diethoxyethane, diethoxymethane, dibutyl ether, anisole or methoxybenzene, veratrole or 1,2-dimethoxybenzene, 1,3-dimethoxybenzene, t-butoxyethoxyethane, 2,5-dimethoxytetrahydrofurane, cyclopentanone ethylene ketal, and combinations thereof. Specific liquid electrolyte solvents that may be favorable towards the cathode (e.g., have relatively high polysulfide solubility, and/or can enable high rate capability and/or high sulfur utilization) include, but are not limited to dimethoxyethane (DME, 1,2-dimethoxyethane) or glyme, diglyme, triglyme, tetraglyme, polyglymes, sulfolane, 1,3-dioxolane (DOL), tetrahydrofurane (THF), acetonirile, and combinations thereof.

In some embodiments, first and second solvents (e.g., anode-side and cathode-side electrolyte solvents, respectively) are chosen at least in part by their reactivity to the anode active material. For instance, in batteries having lithium as anode active material, the anode-side electrolyte solvent may have a relatively low reactivity to lithium. For example, the anode-side electrolyte solvent may have a reactivity to lithium such that less than or equal to 3 wt % Li, less than or equal to 2 wt % Li, less than or equal to 1 wt % Li, or less than or equal to 0.5 wt % Li is reacted per duty cycle (charge and discharge sequence from 0 to 100 and back to 0% state of charge (SOC)). For instance, a lithium battery with dioxolane as an electrolyte may result in 0.6 wt % Li depletion per duty cycle. The cathode-side electrolyte solvent may, in some instances, have a relatively higher reactivity to lithium. E.g., a lithium battery with dimethoxyethane as an electrolyte may result in 3.5 wt % Li depletion per duty cycle. In some embodiments, a heterogeneous electrolyte may include an anode-side electrolyte solvent and a cathode-side electrolyte solvent such that the ratio of wt % Li depletion per duty cycle of the anode-side electrolyte solvent to the wt % Li depletion per duty cycle of the cathode-side electrolyte solvent is less than 1:1, less than 0.7:1, less than 0.5:1, less than 0.2:1, less than 0.1:1, or less than 0.05:1. For instance, this ratio for dioxolane and dimethoxyethane is 0.6/3.5=0.17. Those of ordinary skill in the art can measure the wt % Li reacted per duty cycle from, for example, residual lithium measurements.

In certain embodiments, first and second solvents are chosen at least in part by their ability to dissolve polysulfides. Because the solvents may be chosen such that the cathode-side electrolyte solvent dissolves higher amounts of polysulfide than the anode-side electrolyte solvent, a ratio between polysulfide solubility in the respective solvents may be used to determine suitable solvents. For example, a ratio of polysulfide solubility of the cathode-side solvent electrolyte to the anode-side solvent electrolyte may be greater than 1:1, greater than 2:1, greater than 3:1, greater than 5:1, greater than 7:1, or greater than 10:1. One particular solvent that has a relatively low polysulfide solubility and that can be used as an anode-side electrolyte solvent (that is, favorable towards the anode) is 1,3-dioxolane, which can dissolve up to about 0.6 M of $Li_2S_8$ at room temperature. A solvent having a relatively high polysulfide solubility and that can be used as a cathode-side electrolyte solvent (that is, favorable towards the cathode) is dimethoxyethane, which can dissolve up to about 1.7-1.9 M of $Li_2S_8$ at room temperature (40-45% by weight, i.e., 40-45 wt %). This can translate to a very high S concentration ($[S]_{effective}$~12 M-14 M). The ratio of polysulfide solubility between dimethoxyethane and 1,3-dioxolane is from about 2.8:1 to 3.2:1. Accordingly, in some embodiments, dioxolane and dimethoxyethane may be used as first and second electrolyte solvents in heterogeneous electrolytes described herein. In some cases, the cathode-side electrolyte solvent has a solubility of polysulfide of, for example, greater than 20 wt %, greater than 40 wt %, or greater than 60 wt % at room temperature. Solubility of polysulfides can be measured by those of ordinary skill in the art by, for example, performing simple screening tests such as dissolving a known amount of a polysulfide in a known amount of solvent until saturation has been reached, and determining the wt % dissolved. For example, the inventors have observed the following trend of polysulfide solubility in various solvents (ordered from high to low polysulfide solubility): 1,2-DME (1,2-dimethoxyethane)
>THF>diglyme>triglyme>tetraglyme>acetonitrile>sulfolane>1-methoxy-2-ethoxyethane (MEE)>1,3-dioxolane>1,2-diethoxyethane>diethoxymethane>dibutyl ether.

In other embodiments, first and second solvents are chosen at least in part by their immiscibility with one another. Immiscibility may be determined, in some cases, in the presence of certain solutes dissolved within a solvent. Examples of solvents that may be more favorable towards the anode and that are immiscible with a 42 wt % solution of $Li_2S_8$ in 1,2-dimethoxyethane at room temperature include, but are not limited to, 1,1-dimethoxyethane, 1,1-diethoxyethane, diethoxymethane, dibutyl ether, 2,5-dimethoxytetrahydrofurane, cyclopentanone ethylene ketal, and t-butoxyethoxyethane. It should be understood that other solvents can be used as anode-side and cathode-side electrolyte solvents and that the invention is not limited in this respect.

Determining suitable first and second electrolyte solvents can be carried out by those of ordinary skill in the art, without undue experimentation, while providing the electrolyte with the ability to function effectively in the device and not causing inhibitory or other destructive behavior. As described herein, solvents may be chosen based on one or more characteristics such as their solubility properties (e.g., solubility parameter), reactivity with the anode and/or cathode, ability to dissolve certain species (e.g., polysulfides), compatibility with other parts of the electrolyte (e.g., a polymer layer), ion conductivity, stability in a particular temperature range, etc. In some cases, those of ordinary skill in the art can choose appropriate solvents by a simple screening test. One simple screening test may include adding the solvents to other components of the electrolyte in the presence of the battery components, discharging/charging the battery, and observing whether inhibitory or other destructive behavior occurs compared to that in a control system. Other simple tests can be conducted by those of ordinary skill in the art.

Liquid electrolyte solvents can also be useful as plasticizers for gel polymer electrolytes, i.e., electrolytes comprising one or more polymers forming a semi-solid network. Examples of useful gel polymer electrolyte materials include, but are not limited to, those mentioned above regarding suitable polymeric materials for polymer layers, as well as those such as polyethylene oxides, polypropylene oxides, polyacrylonitriles, polysiloxanes, polyimides, polyphosphazenes, polyethers, sulfonated polyimides, perfluorinated membranes (NAFION resins), polydivinyl polyethylene glycols, polyethylene glycol diacrylates, polyethylene glycol dimethacrylates, crosslinked 1-methoxy-2-(4-vinylphenyl)methoxyethane, derivatives thereof, copolymers thereof, crosslinked and network structures thereof, and blends thereof, and optionally, one or more plasticizers. In some embodiments, a gel polymer electrolyte comprises between 10-20%, 20-40%, between 60-70%, between 70-80%, between 80-90%, or between 90-95% of a heterogeneous electrolyte by volume.

In some embodiments, one or more solid polymers can be used to form a portion of an electrolyte. Examples of useful solid polymer electrolytes include, but are not limited to, those comprising one or more polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing.

In addition to electrolyte solvents, gelling agents, and polymers as known in the art for forming electrolytes, the electrolyte may further comprise one or more ionic electrolyte salts, also as known in the art, to increase the ionic conductivity. Examples of ionic electrolyte salts for use in the electrolytes of the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts that may be useful include lithium polysulfides (Li$_2$S$_x$), and lithium salts of organic ionic polysulfides (LiS$_x$R)$_n$, where x is an integer from 1 to 20, n is an integer from 1 to 3, and R is an organic group, and those disclosed in U.S. Pat. No. 5,538,812 to Lee et al.

Electrolytes may also contain one or more additives such as organic nitro-compounds; inorganic and organic nitrates and nitrites (e.g., LiNO$_3$); and compounds with negatively, neutral and positively charged NO$_x$ groups. These and other additives, which may stabilize lithium/electrolyte reactivity, increase rate of polysulfide dissolution and/or increase sulfur utilization, are described in more detail in U.S. Patent Application No. 2005/0156575, entitled "Methods of charging lithium sulfur cells," which is incorporated herein by reference in its entirety.

Electrolytes may have a range of conductivities. For example, an a heterogeneous electrolyte (or a component thereof) may have a conductivity between $10^{-4}$ S/cm-$10^{-3}$ S/cm. Other conductivities are also possible.

In some embodiments, electrochemical cells may further comprise a separator interposed between the cathode and anode. The separator may be a solid non-conductive or insulative material which separates or insulates the anode and the cathode from each other preventing short circuiting, and which permits the transport of ions between the anode and the cathode.

The pores of the separator may be partially or substantially filled with a liquid electrolyte solvent. Separators may be supplied as porous free standing films which are interleaved with the anodes and the cathodes during the fabrication of cells. Alternatively, the porous separator layer may be applied directly to the surface of one of the electrodes, for example, as described in PCT Publication No. WO 99/33125 to Carlson et al. and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, polytetrafluoroethylene (PTFE), glass fiber filter papers, ceramic materials, and combinations thereof. Further examples of separators and separator materials suitable for use in this invention are those comprising a microporous xerogel layer, for example, a microporous pseudo-boehmite layer, which may be provided either as a free standing film or by a direct coating application on one of the electrodes, as described in U.S. Pat. Nos. 6,153,337 and 6,306,545 by Carlson et al. of the common assignee, and which are incorporated herein by reference in their entirety. Solid electrolytes and gel electrolytes may also function as a separator in addition to their electrolyte function.

A variety of materials and arrangements can be used in individual assemblies described and illustrated herein, or in all of the assemblies. It is to be understood that where a particular component or arrangement is described in connection with one embodiment or figure, that component or arrangement can be used in connection with any others or can be absent from any others. One example of such a structure is a protective layer positioned adjacent an anode. For example, in the embodiment shown in FIG. 1, a protective layer 20 is shown and a polymer layer 24 is supported by the protective layer. However, in other embodiments, a protective layer may be absent and the polymer layer can be supported directly by active anode material layer 18. In yet other embodiments, a protective layer may be positioned adjacent a cathode. In all instances in which a layer is described as being adjacent, or immediately adjacent an electrode, an intervening separation layer can be used but need not be used.

A protective layer may be a single ion conducting layer, i.e., a polymeric, ceramic, or metallic layer that allows certain ions (e.g., Lit) to pass therethrough, which impedes the passage of other components that may otherwise damage the electrode. In some cases, protective layers improve the compatibility of the base electrode material (e.g., lithium) with layers deposited on top of the electrode. A protective layer may also be a temporary protective layer. A "temporary" protective layer is one that ceases to be in existence or identifiable after some time after construction of the device, for example after some period of use of the device. For example, a thin layer of copper positioned over lithium will diffuse into an alloy with the lithium until, after a particular period of time and/or use of the device, the anode will be primarily lithium, with a trace of copper, but the temporary protective layer will no longer exist or be identifiable. In other words, the protective layer may be capable of forming an alloy with lithium metal, or may be capable of diffusing into, dissolving into, and/or blending with lithium metal, e.g., during electrochemical cycling of the cell and/or prior to electrochemical cycling of the cell. The temporary protective layer can act as a barrier layer to protect the lithium surface during deposition of other layers, such as during the deposition of a polymer layered on top of the anode. Further, the temporary protective layer may allow transportation of the lithium films from one processing station to the next without undesirable reactions occurring at the lithium surface during assembly of cells, or for solvent coating of layers onto the anode.

The thickness of the temporary protective material layer is selected to provide the necessary protection to the layer comprising lithium, for example, during subsequent treatments to deposit other anode or cell layers. In some embodiments, it is desirable to keep the layer thickness as thin as possible while providing the desired degree of protection so as to not add excess amounts of non-active materials to the cell which would increase the weight of the cell and reduce its energy density. In one embodiment, the thickness of the temporary protective layer is between 5 to 500 nanometers, e.g., between 20 to 200 nanometers, between 50 to 200 nanometers, or between 100 to 150 nanometers.

Suitable materials that can be used as temporary protective material layers include metals such as copper, magnesium, aluminum, silver, gold, lead, cadmium, bismuth, indium, gallium, germanium, zinc, tin, and platinum.

In some cases, the protective layer can include plasma treated layers such as $CO_2$, $O_2$, $N_2$, and argon induced layers on the anode or cathode. In some embodiments, plasma treated layers can allow nearly the entire anode surface area to participate in the current carrying process. In other words, plasma treated layers may allow uniform current density across a surface and decreases the amount of pitting on a surface. In some cases, these treatments alone routinely increase cycle life by 15% to 35% because more of the Li is available for use during discharge. The plasma surface treatments can make more of the Li available to be cycled by creating a surface that is substantially homogeneous in topography. These and other structures are described in more detail in U.S. patent application Ser. No. 11/400,025, filed Apr. 6, 2006, entitled, "Electrode Protection in both Aqueous and Non-Aqueous Electrochemical Cells, including Rechargeable Lithium Batteries," to Affinito et al., which is incorporated herein by reference in its entirety.

The protective layer may be deposited by any of a variety of methods generally known in the art, such as physical or chemical vapor deposition methods, extrusion, and electroplating. Examples of suitable physical or chemical vapor deposition methods include, but are not limited to, thermal evaporation (including, but not limited to, resistive, inductive, radiation, and electron beam heating), sputtering (including, but not limited to, diode, DC magnetron, RF, RF magnetron, pulsed, dual magnetron, AC, MF, and reactive), chemical vapor deposition, plasma enhanced chemical vapor deposition, laser enhanced chemical vapor deposition, ion plating, cathodic arc, jet vapor deposition, and laser ablation.

The invention is applicable to a wide variety of batteries, including those with an alkali metal as an active anode species (or alloys thereof) and sulfur as an active cathode species, for example. While lithium, as active anode species, is described predominately, it is to be understood that wherever lithium is described as the active anode species herein, any suitable alkali metal can be used. Those of ordinary skill in the art will appreciate this and will be able to select alkali metals for such use.

In one embodiment, an anode comprises an active anode material such as lithium metal, which can serve as the anode active material. The lithium metal may be in the form of, e.g., a lithium metal foil or a thin lithium film that has been deposited on a substrate, as described below.

In another embodiment, the lithium-containing anode is in the form of a lithium alloy such as, for example, a lithium-tin alloy or a lithium aluminum alloy. Additional non-limiting examples of compounds that can be used in an alloy with lithium (or another alkali metal) include elements from Groups 1-17 (e.g., e.g., Groups 2, 10, 11, 12, 13, 14, and/or 15) of the Periodic Table. Suitable elements from Group 2 of the Periodic Table may include beryllium, magnesium, calcium, strontium, barium, and radium.

Suitable elements from Group 10 may include, for example, nickel, palladium, or platinum. Suitable elements from Group 11 may include, for example, copper, silver, or gold. Suitable elements from Group 12 may include, for example, zinc, cadmium, or mercury. Elements from Group 13 that may be used in anodes described herein may include, for example, boron, aluminum, gallium, indium, or thallium. Elements from Group 14 that may be used include, for example, carbon, silicon, germanium, tin, or lead. Elements from Group 15 that may be used may include, for example, nitrogen, phosphorus, or bismuth. Combinations of the above-mentioned elements can also be used. Additionally, in some instances, N, O, C, or other nonmetals that may form an alloy with lithium and which may be in the form of a gas (e.g., $N_2$, $O_2$, and $CO_2$) prior to forming an alloy with lithium, may be used. These and other alloys and are described in more detail in U.S. patent application Ser. No. 11/821,576, filed Jun. 22, 2007 and entitled, "Lithium Alloy/Sulfur Batteries", which is incorporated herein by reference in its entirety.

In addition, it is also to be understood that the invention is applicable to batteries including lithium intercalation compounds (e.g., lithium-intercalated carbons and graphites) as an active anode species. Both of these anode types are very well known in the art. Examples of lithium intercalation compounds are described in U.S. Pat. No. 6,245,465, entitled, "Non-aqueous electrolyte solvents for secondary cells," by Angell et al.

Thickness of the anode may vary from, e.g., about 2 to 200 microns. For instance, the anode may have a thickness of less than 200 microns, less than 100 microns, less than 50 microns, less than 25 microns, less than 10 microns, or less than 5 microns. The choice of the thickness may depend on cell design parameters such as the excess amount of lithium desired, cycle life, and the thickness of the cathode electrode. In one embodiment, the thickness of the anode active layer is in the range of about 2 to 100 microns. In another embodiment, the thickness of the anode is in the range of about 5 to 50 microns. In another embodiment, the thickness of the anode is in the range of about 5 to 25 microns. In yet another embodiment, the thickness of the anode is in the range of about 10 to 25 microns.

Methods for depositing a negative electrode material (e.g., an alkali metal anode such as lithium) onto a substrate may include methods such as thermal evaporation, sputtering, jet vapor deposition, and laser ablation. Alternatively, where the anode comprises a lithium foil, or a lithium foil and a substrate, these can be laminated together by a lamination process as known in the art, to form an anode layer.

Suitable cathode active materials for use in the cathode of the batteries of the invention include, but are not limited to, electroactive transition metal chalcogenides, electroactive conductive polymers, and electroactive sulfur-containing materials, and combinations thereof. As used herein, the term "chalcogenides" pertains to compounds that contain one or more of the elements of oxygen, sulfur, and selenium. Examples of suitable transition metal chalcogenides include, but are not limited to, the electroactive oxides, sulfides, and selenides of transition metals selected from the group consisting of Mn, V, Cr, Ti, Fe, Co, Ni, Cu, Y, Zr, Nb, Mo, Ru, Rh, Pd, Ag, Hf, Ta, W, Re, Os, and Ir. In one embodiment, the transition metal chalcogenide is selected from the group consisting of the electroactive oxides of nickel, manganese, cobalt, and vanadium, and the electroactive sulfides of iron. In one embodiment, the cathode active layer comprises an electroactive conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Preferred conductive polymers are polypyrroles, polyanilines, and polyacetylenes.

In some embodiments, electroactive materials for use as cathode active materials in electrochemical cells described herein include electroactive sulfur-containing materials. "Electroactive sulfur-containing materials," as used herein, relates to cathode active materials which comprise the element sulfur in any form, wherein the electrochemical activity involves the oxidation or reduction of sulfur atoms or moieties. The nature of the electroactive sulfur-containing materials useful in the practice of this invention may vary widely, as known in the art. For example, in one embodiment, the electroactive sulfur-containing material comprises elemental sulfur. In another embodiment, the electroactive sulfur-containing material comprises a mixture of elemental sulfur and a sulfur-containing polymer. Thus, suitable electroactive sulfur-containing materials may include, but are not limited to, elemental sulfur and organic materials comprising sulfur atoms and carbon atoms, which may or may not be polymeric. Suitable organic materials include those further comprising heteroatoms, conductive polymer segments, composites, and conductive polymers.

In one embodiment, the electroactive sulfur-containing material comprises greater than 50% by weight of sulfur. In another embodiment, the electroactive sulfur-containing material comprises greater than 75% by weight of sulfur. In yet another embodiment, the electroactive sulfur-containing material comprises greater than 90% by weight of sulfur.

The nature of the electroactive sulfur-containing materials useful in the practice of this invention may vary widely, as known in the art. In one embodiment, the electroactive sulfur-containing material comprises elemental sulfur. In another embodiment, the electroactive sulfur-containing material comprises a mixture of elemental sulfur and a sulfur-containing polymer.

Examples of sulfur-containing polymers include those described in: U.S. Pat. Nos. 5,601,947 and 5,690,702 to Skotheim et al.; U.S. Pat. Nos. 5,529,860 and 6,117,590 to Skotheim et al.; and U.S. patent application Ser. No. 08/995,122 now U.S. Pat. No. 6,201,100 issued Mar. 13, 2001, to Gorkovenko et al. of the common assignee and PCT Publication No. WO 99/33130. Other suitable electroactive sulfur-containing materials comprising polysulfide linkages are described in U.S. Pat. No. 5,441,831 to Skotheim et al.; U.S. Pat. No. 4,664,991 to Perichaud et al., and in U.S. Pat. Nos. 5,723,230, 5,783,330, 5,792,575 and 5,882,819 to Naoi et al. Still further examples of electroactive sulfur-containing materials include those comprising disulfide groups as described, for example in, U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

The cathode active layers of the present invention may comprise from about 20 to 100% by weight of electroactive cathode materials. In one embodiment, the amount of electroactive sulfur-containing material in the cathode active layer is preferably in the range 20% to 90% by weight of the cathode active layer.

Cathodes may further comprise one or more conductive fillers to provide enhanced electronic conductivity. Conductive fillers can increase the electrically conductive properties of a material and may include, for example, conductive carbons such as carbon black (e.g., Vulcan XC72R carbon black, Printex XE2, or Akzo Nobel Ketjen EC-600 JD), graphite fibers, graphite fibrils, graphite powder (e.g., Fluka #50870), activated carbon fibers, carbon fabrics, non-activated carbon nanofibers. Other non-limiting examples of conductive fillers include metal coated glass particles, metal particles, metal fibers, nanoparticles, nanotubes, nanowires, metal flakes, metal powders, metal fibers, metal mesh. In some embodiments, a conductive filler may include a conductive polymer. Examples of suitable electroactive conductive polymers include, but are not limited to, electroactive and electronically conductive polymers selected from the group consisting of polypyrroles, polyanilines, polyphenylenes, polythiophenes, and polyacetylenes. Other conductive materials known to those of ordinary skill in the art can also be used as conductive fillers. The amount of conductive filler in a primer layer, if present, may be present in the range of, for example, 20-80% by weight of the primer layer (e.g., as measured after the primer layer has been dried and/or cured).

As described above, cathodes may also comprise a binder. The choice of binder material may vary widely so long as it is inert with respect to the other materials in the cathode. In some cases, the binding can also be chosen based on its ability to solvate a particular electrolyte solvent (e.g., such that the electrolyte solvent is present disproportionately at the cathode during operation of the battery). Useful binders are those materials, usually polymeric, that allow for ease of processing of battery electrode composites and are generally known to those skilled in the art of electrode fabrication. Examples of useful binders include polytetrafluoroethylenes (Teflon), polyvinylidene fluorides ($PVF_2$, PVdF, polyvinylidene fluoride-hexafluoropropylene copolymer (PVdF-HFP)), ethylene-propylene-diene (EPDM) rubbers, polyethylene oxides (PEO), UV curable acrylates, UV curable methacrylates, and heat curable divinyl ethers, and the like. The amount of binder, if present, may be present in the range of 20-80% by weight of the primer layer.

Positive electrode layers may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

Batteries described herein may, in some embodiments, include one or more substrates, which are useful as a support on which to deposit the electroactive materials. The substrate may also provide stability for handling of thin lithium film anodes during cell fabrication. Further, in the case of conductive substrates, a substrate may also function as a current collector useful in efficiently collecting the electrical current generated throughout the anode and in providing an efficient surface for attachment of electrical contacts leading to an external circuit. A wide range of conductive supports are known in the art. Suitable conductive supports include, but are not limited to, those including metal foils (e.g., aluminum foil), polymer films, metallized polymer films (e.g., aluminized plastic films, such as aluminized polyester film), electrically conductive polymer films, polymer films having an electrically conductive coating, electrically conductive polymer films having an electrically conductive metal coating, and polymer films having conductive particles dispersed therein. In some embodiments of the invention, the conductive support may comprise a conductive metal such as aluminum, copper, and nickel. Other conductive supports may include, for example, expanded metals, metal mesh, metal grids, expanded metal grids, metal wool, woven carbon fabric, woven carbon mesh, non-woven carbon mesh, and carbon felt. It should be understood, however, that in some embodiments, a substrate is not required for the anode and/or cathode. For example, if the active anode material layer is self-supporting (e.g., in the form of a lithium foil), a substrate for the active anode material may not be present.

The figures that accompany this disclosure are schematic only, and illustrate a substantially flat battery arrangement. It is to be understood that any battery arrangement can be constructed, employing the principles of the present invention, in any configuration. For example, with reference to FIG. 1, anode active material layer 10 may be covered on the side opposite the side at which components 20 and 24 are illustrated with a similar or identical set of components 20 and 24. In this arrangement, a substantially mirror-image structure is created with a mirror plane passing through the electrode. This would be the case, for example, in a "rolled" battery configuration in which an anode active material layer 10 is surrounded on each side by structures 24, 26, and 30 (or, in alternative arrangements layered structures illustrated in other figures herein). In a rolled arrangement, or other arrangement including multiple layers of alternating anode and cathode functionality, the structure involves anode, electrolyte, cathode, electrolyte, anode, etc., where each electrode can include polymer layers as described in any part of this disclosure. Of course, at the outer boundaries of such an assembly, a "terminal" anode or cathode will be present. Circuitry to interconnect such a layered or rolled structure is well-known in the art.

The following examples are intended to illustrate certain embodiments of the present invention, but are not to be construed as limiting and do not exemplify the full scope of the invention.

Example 1

Synthesis of a Gel Polymer Electrolyte for a Battery Including a Lithium Anode

A gel polymer electrolyte was formed by mixing 8.9 g of electrolyte (dimethoxyethane (40%), dioxolane (40%), lithium bis-(trifluoromethylsulfonyl)imide (16%), lithium nitrate(4%)), 1 g of 1-methoxy-2-(4-vinylphenyl)methoxyethane monomer, 0.1 g of divinylbenzene crosslinking agent, and 0.01 g AIBN. The mixture was heated at 50° C. for 39 hours to obtain a transparent gel polymer electrolyte. This electrolyte had an ionic conductivity of 5.2 mS.

Example 2

Synthesis of a Gel Polymer Electrolyte for a Battery Including a Lithium Anode

A gel polymer electrolyte was formed using the method described in Example 1 except the mixture was heated at 100° C. for 6 minutes. This electrolyte had an ionic conductivity of 5.1 mS.

Example 3

A Cell Having Low/Zero Polysulfide Solubility Electrolyte

Mixture of 65 wt % of diethoxymethane (DEM), 33 wt % of lithium imide salt, and 2 wt % of $LiNO_3$ was formed. The above electrolyte (7.6 g) was added to a standard design cell (cathode containing 73 wt % sulfur, 16 wt % carbon XE2, 6 wt % carbon Ketjenblack and 5 wt % polyethylene; lithium metal anode and separator). The cells were operated by being charged to 2.5 V at 50 mA and discharged to 1.7 V at 50 mA. After 10 cycles, a first set of cells were disassembled. ESM images of the Li anode showed very compact metallic lithium deposits. In addition, the first set of cells did not swell. A second set of cells were allowed to cycle at +50° C. for 140 hours. The second set of cells did not show gas generation.

This example shows that cells having a relatively low/zero polysulfide solubility electrolyte positioned had improved anode cycle-ability and less gas generation compared to cells with a relatively high polysulfide solubility electrolyte (formed by the method described in Comparative Example 3).

Comparative Example 3

Electrochemical Cell Having High Polysulfide Solubility Electrolyte

Cells similar to the one described in Example 3 was formed except a relatively low polysulfide solubility electrolyte was not used. Instead, an electrolyte including DME/DOL (1:1 w/w), 16 wt % lithium imide, and 4 wt % lithium nitrate was used to fill the cells.

The cells were operated using the method described in Example 3. After 4 cycles, the cells swelled from 11 mm to 17.5 mm and cycling was stopped. Disassembly of the cells showed many powdery deposits on the Li anode. In addition, the cells, which were cycled at +50° C., generated gas after first cycle.

Example 4

Electrochemical Cells with 5 wt % Polyvinylidene Fluoride-Hexafluoropropylene Copolymer in the Cathode This example shows a method of fabricating a cathode including polyvinylidene fluoride-hexafluoropropylene copolymer incorporated into the bulk of the cathode.

A cathode was made by replacing the 5 wt % polyethylene powder in the baseline cathode formulation with 5 wt % polyvinylidene fluoride-hexafluoropropylene copolymer (PVdF-HFP having the chemical formula $\{-CH_2-CF_2-\}_x$-$\{CF_2-CF(CF_3)-\}$) (Kynar 2801). The formulation of the cathode was 73 wt % sulfur, 16 wt % XE2 (a carbon black grade of very high surface area produced by Degussa), 6 wt % Ketjenblack (a carbon black grade of high surface area produced by Akzo Nobel) and 5 wt % Kynar on a PET/Al substrate at 1.58 mg $S/cm^2$. The PET/Al substrate was formed of 6 µm PET, which is used as a support and is coated on one side with 500 Å aluminum; the other side of the support is coated with a 3 µm-thick carbon/EAA-based primer made by Rexam, which is used for adhesion to the cathode active material. Prismatic cells were made using 2 mil lithium as the anode. The cell was filled with 7.6 g of a DOL/DME-based electrolyte (45.4 wt % DOL, 45.4 wt % DME, 4 wt % LiTFSI, 3.8 wt % $LiNO_3$, 1 wt % guanidine nitrate and 0.4 wt % pyridine nitrate).

Figure 7:
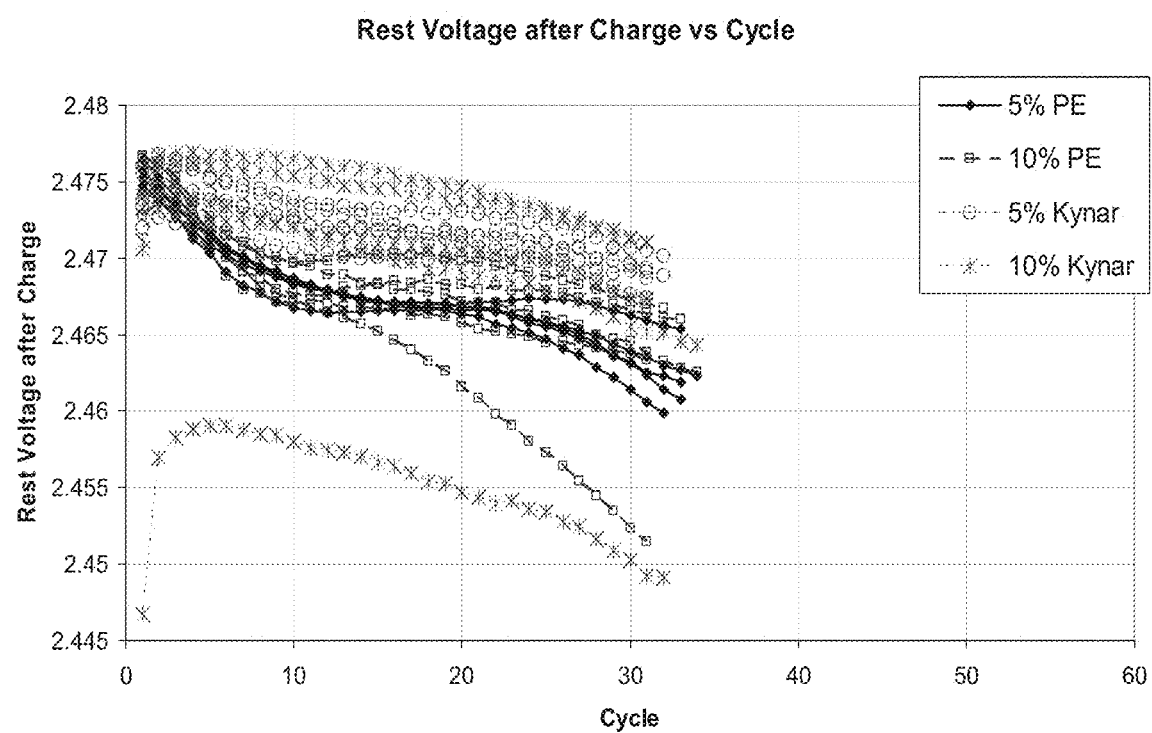
FIG. 7 shows a plot comparing rest voltage after charge vs. cycle for lithium batteries having sulfur cathodes, with and without polyvinylidene fluoride-hexafluoropropylene copolymer dispersed therein, according to one embodiment of the invention.
Figure 8:
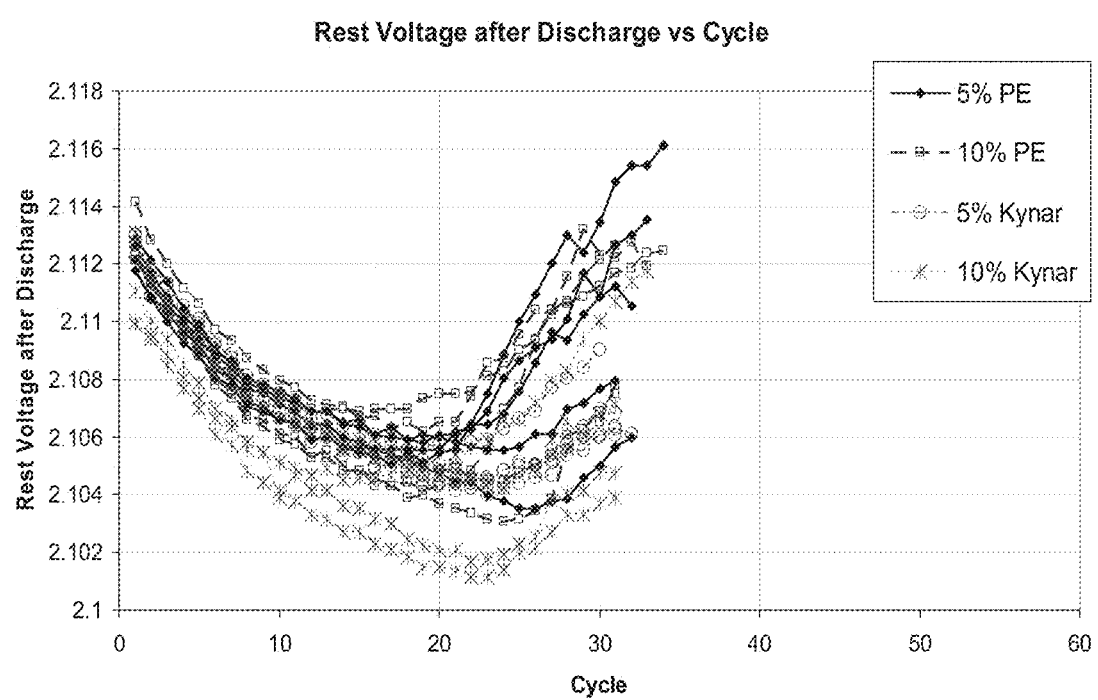
FIG. 8 shows a plot comparing rest voltage after discharge vs. cycle for lithium batteries having sulfur cathodes, with and without polyvinylidene fluoride-hexafluoropropylene copolymer dispersed therein, according to one embodiment of the invention.

As shown in FIGS. 7 and 8, the cells showed lower relaxation at the end of charge and at the end of discharge open circuit voltages, respectively, than those in Comparative Example 4. This indicates that the cells were less polarized than those without polyvinylidene fluoride-hexafluoropropylene copolymer in the cathode, meaning less insoluble polysulfides were generated in cells with polyvinylidene fluoride-hexafluoropropylene copolymer in the cathode or the anode reacted with the electrolyte (or species within the electrolyte) to a lesser extent.

Comparative Example 4

Electrochemical Cells with 5 wt % Polyethylene in the Cathode

Control cells were fabricated with baseline cathodes having 5 wt % polyethylene dispersed therein. The formulation of the cathode was 73 wt % sulfur, 16 wt % XE2, 6 wt % Ketjenblack and 5 wt % Kynar on standard Rexam/Al/PET substrate at 1.58 mg $S/cm^2$. The two carbon black powders were first ball milled (without media) for 20 min at 50% speed. The sulfur and PE were combined with isopropyl alcohol (IPA) and milled in an attritor for 15 min at high speed (350 rpm). The speed was lowered to 100 rpm and the carbons were then added and continued to mill for another 5 min to disperse the powders and make a suspension. The attritor was then discharged at 300 rpm over 5 min. The suspension was then coated on the Rexam/Al/PET substrate with a slot die. The slurry was dried in a 10 ft combination IR and convection oven set at 200-350° F.

Example 5

Electrochemical Cells with 10 wt % Polyvinylidene Fluoride-Hexafluoropropylene Copolymer in the Cathode This example shows the fabrication of another cell including polyvinylidene fluoride-hexafluoropropylene copolymer incorporated into the bulk of the cathode.

A cathode was made using the method described in Example 4, except 10% wt Kynar 2801 was used. The formulation of the cathode was 68 wt % sulfur, 16 wt % XE2, 6 wt % Ketjenblack and 10 wt % Kynar. Prismatic cells were made using 2 mil lithium as the anode. The cell was filled with 7.6 g of a DOL/DME-based electrolyte (45.4 wt % DOL, 45.4 wt % DME, 4 wt % LiTFSI, 3.8 wt % $LiNO_3$, 1 wt % guanidine nitrate and 0.4 wt % pyridine nitrate).

As shown in FIGS. 7 and 8, the cells showed lower relaxation at the end of charge and at the end of discharge open circuit voltages than the cells in Example 4 (with 5% wt Kynar), which indicates that the cells were even less polarized than the cells in Example 4 and Comparative Examples 4 and 5.

Comparative Example 5

Electrochemical Cells with 10 wt % Polyethylene in the Cathode

Control cells were fabricated with baseline cathodes having 10 wt % polyethylene dispersed therein. The formulation of the cathode was 68 wt % Sulfur, 16 wt % XE2, 6 wt % Ketjen and 10 wt % polyethylene.

Example 6

Electrochemical Cells Formed by Depositing a Polymer Layer on the Anode and Exposing the Polymer Layer to a First Electrolyte Solvent Prior to Addition of a Cathode This example shows the fabrication of an electrochemical cell by depositing a polymer layer at an anode and then exposing the anode (including the polymer layer) to a first electrolyte solvent, prior to addition of a cathode and a second electrolyte solvent.

A 50 μm thick Li anode was made by vacuum depositing a layer of lithium on a PET substrate coated with a 1000 Angstroms thick Inconel layer, which was used as a current collector. The lithium layer thickness was 25 μm. The Li anode was coated with polymer using the following procedure.

A mixture of materials was formulated and coated on the Li anode surface using the Mayer Rod technique to form the polymer layer. The mixture included glycidyl isobutyl ether 73% monomer, bis-Phenol-F 25% cross-linker, diphenyliodonium hexafluorophosphate 2% photo initiator, and SiO2 (TS-720) 3.5% and poly(ethyl vinyl ether) 5%, which was used as a filler and thickener and was added on top. The coated anode was then exposed to UV light to cure the coated mixture. Curing resulted in a polymer film with a thickness of 25 μm.

The anode including the polymer layer was exposed to dibutyl ether (e.g., a first electrolyte) for 2 hours. After 2 hours, the polymer film was swollen with the dibutyl Ether solvent; that is, the polymer film absorbed the solvent. The polymer contained ~40 wt % of solvent.

To prepare the cathode, a mixture of 73 wt % of elemental sulfur, 16 wt % of a first conductive carbon pigment, PRINTEX® XE-2, 6 wt % of a second conductive pigment, Carbon Ketjen Black®, and 5 wt % of polyethylene powder dispersed in isopropanol was coated onto one side of a 12 micron thick Al foil substrate with a carbon-containing primer layer. After drying the coated cathode active layer, the film was measured to have a thickness of about 50 microns. The sulfur surface loading was 1.58 mg/cm$^2$.

A Li—S electrochemical Li—S was assembled using the anode and cathode described above. A porous 16 μm Tonen separator was positioned between the anode and cathode prior to assembly. The active surface area of the electrodes was 16.6 cm$^2$. The cathode and porous separator were filled with 84 wt % of 1,2-dimethoxyethane and 16 wt % of salt-lithium bis(trifluromethanesulfoneimide) (e.g., a second electrolyte solvent). The total amount of the second electrolyte solvent was 0.2 g.

The first and second electrolyte solvents were chosen for this particular electrochemical cell because dibutyl Ether does not dissolve polysulfide and is immiscible with polysulfides solutions in 1,2-dimethoxyethane. Accordingly, the first and second electrolytes were expected to partition in this electrochemical cell.

The electrochemical cell was subjected to discharge at a current of 6.6 mA to 1.7 V and than charged at a current of 4.1 mA to 2.7 V.

Figure 9:
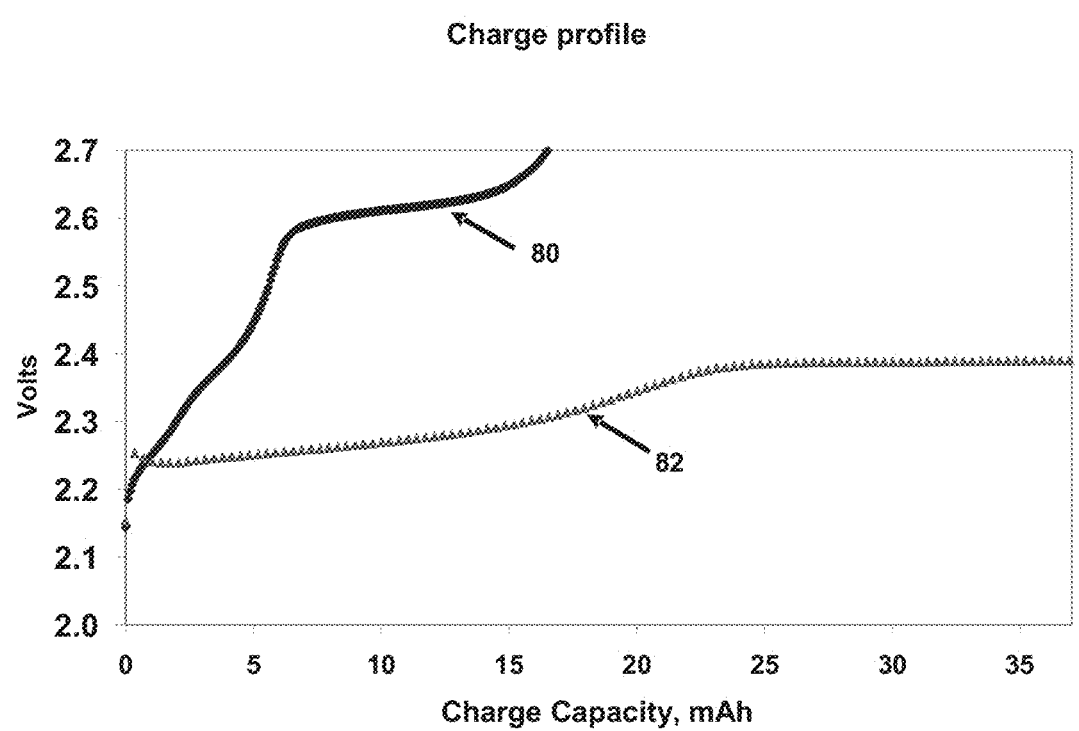
FIG. 9 shows a plot comparing performance of an electrochemical cell having partitioned solvents and an electrochemical cell without partitioned solvent, according to one embodiment of the invention.

FIG. 9 is a plot showing the performance of the electrochemical cell in comparison with the control cell described in Comparative Example 6. The electrochemical cell showing voltage leveling (line 82) instead of a sharp voltage rise at the end of charge (e.g., the control cell, no electrolyte partition) demonstrates that the polysulfide shuttle is strong. Electrochemical cells with a strong shuttle typically showed inability to be charged completely. By contrast, the electrochemical cell with a solvent having low polysulfide solubility showed a voltage-controlled charge and a sharp voltage increase when the cell charge is completed (line 80), meaning that the polysulfide shuttle was inhibited (e.g., even in the absence of nitrate). Reduction of the polysulfide shuttle is an important and expected function of a dual-phase system comprising a solvent having low solubility of polysulfides. Observing voltage controlled charge (shuttle inhibition) is an important proof of principle for dual-solvent approach.

Accordingly, these data show that a dual-solvent approach functions as an effective anode protection layer.

Comparative Example 6

As a comparative example, the same electrochemical cell as the one described in Example 6 was formed except the Li anode was not coated with a polymer swollen in dibutyl ether solvent. The electrochemical cell was filled with a single solvent, 84 wt % of 1,2-dimethoxyethane and 16 wt % of salt-lithium bis(trifluromethanesulfoneimide) (e.g., a second electrolyte solvent). In such an electrochemical cell, no partitioning of solvent was expected.

The electrochemical cell was subjected to discharge at a current of 6.6 mA to 1.7 V and than charged at a current of 4.1 mA to 2.7 V.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of", when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A lithium battery, comprising:
   a first electrode comprising lithium as an electroactive species;
   a second electrode comprising an electroactive species; and
   a heterogeneous electrolyte between the first electrode and the second electrode, wherein the heterogeneous electrolyte comprises a first electrolyte solvent comprising benzene and a second electrolyte solvent comprising one or more non-aqueous organic solvents selected from the group consisting of carbonates, sulfones, acetals, esters, and ethers, wherein the first electrolyte solvent is present disproportionately near the first electrode and the second electrolyte solvent is present disproportionately near the second electrode during use, and wherein the first and second electrolyte solvents are immiscible with one another during use of the lithium battery.

2. The lithium battery as in claim 1, wherein the benzene is selected from one or more of methoxybenzene, 1,2-dimethoxybenzene, or 1,3-dimethoxybenzene.

3. The lithium battery as in claim 1, wherein the second electrolyte solvent comprises one or more carbonates.

4. The lithium battery as in claim 3, wherein the one or more carbonates comprise a fluorinated carbonate.

5. The lithium battery as in claim 1, wherein the first electrolyte solvent is present disproportionately near the first electrode at a molar or weight ratio of at least 2:1 relative to the second electrolyte solvent.

6. The lithium battery as in claim 1, wherein the first electrode comprises lithium metal.

7. The lithium battery as in claim 6, wherein the first electrode further comprises a lithium alloy.

8. The lithium battery as in claim 1, wherein the first electrode comprises a lithium intercalation compound as the electroactive species.

9. The lithium battery as in claim 1, wherein the first and/or second electrolyte solvents comprise one or more lithium salts.

10. The lithium battery as in claim 9, wherein the one or more lithium salts comprise one or more salts selected from the group consisting of $LiPF_6$, LiTFSI, LiSCN, LiBr, LiI, $LiClO_4$, $LiAsF_6$, $LiSO_3CF_3$, $LiSO_3CH_3$, $LiBF_4$, $LiB(Ph)_4$, $LiC(SO_2CF_3)_3$, and $LiN(SO_2CF_3)_2$.

11. The lithium battery as in claim 9, wherein the one or more lithium salts comprise a lithium imide salt.

12. The lithium battery as in claim 9, wherein the one or more lithium salts comprise $LiPF_6$.

13. The lithium battery as in claim 1, wherein the first and second electrolyte solvents are miscible with one another before, but immiscible after, commencement of a first discharge.

14. The lithium battery as in claim 1, further comprising a separator positioned between the first electrode and the second electrode.

15. The lithium battery as in claim 1, wherein the second electrolyte solvent comprises one or more carbonates and a lithium imide salt.

16. The lithium battery as in claim 1, wherein the second electrolyte solvent comprises a fluorinated carbonate and a lithium imide salt.

17. The lithium battery as in claim 1, wherein the first and/or second electrolyte solvents are fluorinated.

18. A lithium battery, comprising:
a first electrode comprising lithium as an electroactive species;
a second electrode comprising an electroactive species; and
a heterogeneous electrolyte between the first electrode and the second electrode, wherein the heterogeneous electrolyte comprises a first electrolyte solvent comprising benzene and a second electrolyte solvent comprising one or more non-aqueous organic solvents selected from the group consisting of carbonates, sulfones, acetals, esters, and ethers, wherein the first electrolyte solvent is present disproportionately near the first electrode and the second electrolyte solvent is present disproportionately near the second electrode during use, and wherein the first electrolyte solvent is present disproportionately near the first electrode at a molar or weight ratio of at least 2:1 relative to the second electrolyte solvent.

19. The lithium battery as in claim 18, wherein the first and/or second electrolyte solvents comprise one or more lithium salts, and wherein the one or more lithium salts comprise one or more salts selected from the group consisting of $LiPF_6$, LiTFSI, LiSCN, LiBr, LiI, $LiClO_4$, $LiAsF_6$, $LiSO_3CF_3$, $LiSO_3CH_3$, $LiB F_4$, $LiB(Ph)_4$, $LiC(SO_2CF_3)_3$, and $LiN(SO_2CF_3)_2$.

20. The lithium battery as in claim 18, wherein the first and/or second electrolyte solvents comprise one or more lithium salts, and wherein the one or more lithium salts comprise a lithium imide salt.

21. The lithium battery as in claim 18, wherein the second electrolyte solvent comprises one or more carbonates.

22. The lithium battery as in claim 21, wherein the one or more carbonates comprise a fluorinated carbonate.

23. The lithium battery as in claim 18, wherein the first and/or second electrolyte solvents are fluorinated.

24. The lithium battery as in claim 18, wherein the first electrode comprises lithium metal and/or a lithium alloy.

* * * * *